United States Patent [19]

Werblin et al.

[11] Patent Number: 5,717,834
[45] Date of Patent: Feb. 10, 1998

[54] CNN PROGRAMAMBLE TOPOGRAPHIC SENSORY DEVICE

[76] Inventors: Frank S. Werblin, 1051 Cragmont, Berkeley, Calif. 94708; Tamas Roska, Kikelet-u. 38/B, Budapest H-1125, Hungary; Leon O. Chua, 2916 Avalon Ave., Berkeley, Calif. 94705

[21] Appl. No.: 583,897

[22] Filed: Jan. 11, 1996

Related U.S. Application Data

[63] Continuation of Ser. No. 112,115, Aug. 26, 1993, abandoned.

[51] Int. Cl.$^6$ ........................................ G06F 15/18
[52] U.S. Cl. ........................... 395/27; 395/24; 395/21
[58] Field of Search ................................. 382/155–159; 395/20–25, 27

[56] References Cited

U.S. PATENT DOCUMENTS

| | | | |
|---|---|---|---|
| 4,962,342 | 10/1990 | Mead et al. | 307/201 |
| 5,093,781 | 3/1992 | Castelaz | 395/27 |
| 5,130,563 | 7/1992 | Nabet et al. | 395/25 |
| 5,140,670 | 8/1992 | Chua et al. | 395/24 |

OTHER PUBLICATIONS

Leon O. Chua, et al., *Cellular Neural Networks, Theory and Applications*, IEEE Transactions on Circuits and Systems, vol. 35, No. 10, (Oct. 1988), pp. 1257–1290.
Carver A. Mead, et al., *A Silicon Model of Early Visual Processing*, Neural Networks, vol. 1 (1988), pp. 91–97.
Carver Mead, *Adaptive Media*, Analog VLSI and Neural Systems, Addison Wesley (1989), pp. 239–246.
1990 IEEE International Workshops on Cellular Neural Networks and Their Applications, CNNA–90 Proceedings, Hotel AGRO Budapest, Hungary, Dec. 16–19, 1990.
Frank Werblin, *Synaptic Connections, Receptive Fields, and Patterns of Activity in the Tiger Salamander Retina*, Investigative Ophthalmology & Visual Science, vol. 32, No. 3, (Mar. 1991), pp. 459–483.
Jeffrey L. Teeters, et al., *Real Time Stimulation of the Retina Allowing Visualization of Each Processing Stage*, SPIE vol. 1472, Image Understanding and the Man–Machine Interfce III (1991), pp. 6–16.
J.M. Cruz, et al., *A CNN Chip for Connected Component Detection*, IEEE Transactions on Circuits and Systems, vol. 38, No. 7, (Jul. 1991), pp. 812–817.
Leon O. Chua, *The Genesis of Chua's Circuit*, AEU, vol. 46, No. 4, (1992), pp. 187–257.
Roska et al, "The use of CNN models in the subcortical visual pathway"; IEEE Transactions on Circuits and Systems I: Fundamental Theory and Applications, vol. 40 Iss. 3, pp. 182–195, Mar. 1993.

*Primary Examiner*—Tariq R. Hafiz
*Attorney, Agent, or Firm*—Allston L. Jones

[57] ABSTRACT

The main design components underlying the implementation of physiologically faithful retina and other topographic sensory organ models on Cellular Neural Network (CNN) universal chips is discussed. If the various retinas are implemented on a CNN universal chip, in a programmable way, it can be called a "CNN bionic eye", a device capable of performing a broad range of image processing functions similar to those performed by biological retinas. The CNN universal machine has the special properties that it is 1) programmable and 2) includes local memory. Programming is stored in analog and logical form (the analogic program) generated by an analogic programming and control unit, so the functions of the CNN universal machine can be modified as a function of complex internal and external constraints. Further, several CNN bionic eyes and other topographic sensory modalities can be combined on a single CNN universal chip, and, for more complex sensory tasks, the necessary physical microsensors to provide the input signals can be implemented on the chip, in most instances.

18 Claims, 14 Drawing Sheets

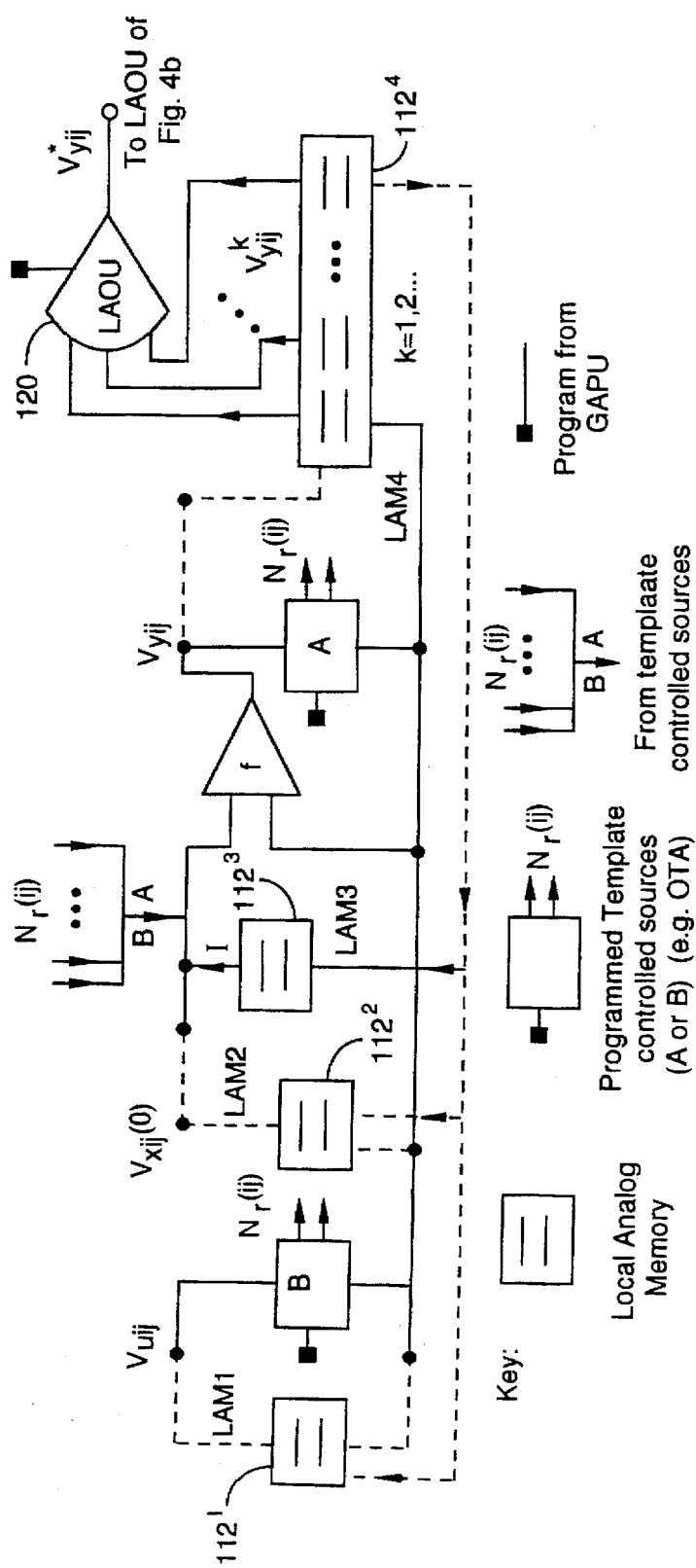
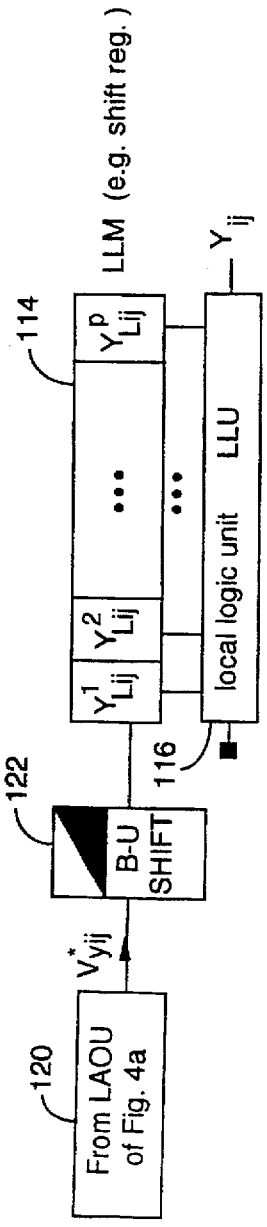
Fig. 4a (PRIOR ART)
Fig. 4b (PRIOR ART)

CNN PROGRAMAMBLE TOPOGRAPHIC SENSORY DEVICE

This is a continuation of application of Ser. No. 08/112,115 filed on Aug. 26, 1993, now abandoned.

GOVERNMENT RIGHTS

This invention was made with Government support under Grant (Contract) Nos. EY00561 awarded by the National Institutes of Health, AFOSR 91 0196 awarded by the Air Force Office of Scientific Research, N00014-89- J-1402 awarded by the Office of Naval Research and MIP-8912639 awarded by the National Science Foundation. The Government has certain rights in this invention.

CROSS-REFERENCE

This invention is related to issued U.S. Pat. No. 5,140,670, issued Aug. 18, 1992, entitled "CELLULAR NEURAL NETWORK", and an earlier filed patent application entitled "CNN UNIVERSAL MACHINE AND SUPERCOMPUTER" having been assigned Ser. No. 07/959,562, filed on Oct. 13, 1992, by Tamas Roska and Leon O. Chua, both of which have been assigned to the same assignee as is the present patent application.

1. Field of the Invention

The present invention relates to cellular neural networks (CNN), and more particularly to a fully programmable, or programmed, CNN supercomputer that functions as a CNN bionic eye or other topographic sensory organ, or combinations of such organs which may have functions that are extensions of those that occur naturally in living organisms.

2. Background of the Invention

During the past decade there has been an enormous increase in the understanding of vertebrate retinal function. The time and space constants have now derived for some animals, as well as the transfer functions that associate retinal elements, thus, complete dynamic models have been generated.

A number of recent attempts have been made to implement retinal function on silicon chips and some simple artificial electronic realizations based on phenomenology of retinal function are available. The digital simulation of the tiger salamander retina model also proved to be a faithful model as well.

A cellular neural network (CNN) is a multi-dimensional lattice array of a plurality of identical cells. In a two-dimensional planar array of cells, the array may be either square, rectangular, or hexagonal. For the n-dimensional case, the array in any direction can have one or more cells, i.e., there does not have to be the same number of cells in each of the n-dimensions of the array. With respect to any single cell, the cells closet to it are its neighbor cells. Additionally, the neighbor cells of each cell expand concentrically from that single cell as concentric circles, or partial concentric circles, of neighbor cells. Each cell in the array interacts non-linearly and in continuous time with a prescribed number of concentric circles of neighbor cells within the lattice. Adjacent cells can interact directly with each other, and cells not directly connected together may affect each other indirectly because of the propagation effects of the CNN.

In a two dimensional, single-layer CNN, each circle of neighbor cells will also be two dimensional and be a sub-set of the cells in the single-layer of the CNN. In a three dimensional CNN, there will be at least two layers of CNNs and the neighbor cells may be either restricted to the single layer in which they are physically located, or the neighborhood of cells could also be three dimensional and incorporate portions of several layers much like layers of an onion. The actual application dictates whether the neighborhood of cells are two or three dimensional.

The basic unit of a CNN is the cell. Each cell contains linear and nonlinear circuit elements, which may include linear capacitors, linear inductors, linear resistors, linear and nonlinear controlled sources, and independent sources.

The CNN universal machine and supercomputer extends the basic CNN into a cellular analog stored-program multidimensional array computer with local analog and logic memory, analogical computing units, and local and global communication and control units. The global analog stored-program memory concept is a key element of the CNN universal chip architecture providing the implementation of analogical algorithms using time-multiplex templates.

The CNN machine is universal in the same sense as a Turing machine except that all of the signals are analog, not digital. However, the so called dual computing structure in the CNN architecture allows a direct combination of analog and logic signals, without any analog-digital conversion. Recently a programmable CNN device with local memory, the CNN universal machine was invented with this device allowing one to program an unlimited range of spatio-temporal transformations, linear and nonlinear, in 2 or 3 dimensions. CNN templates have also been used to successfully process pictures with areas of vastly different local illumination.

SUMMARY OF THE INVENTION

The CNN universal machine and supercomputer can be used implement any topographic bionic sensor, and to illustrate that, this disclosure presents the details of how to implement the CNN universal machine to build a bionic eye that can perform all the known functions of vertebrate retinas, and extend beyond the phenomenological models. The same techniques are also applicable to the implementation of other bionic sensors using the CNN.

The image processing functions performed by the CNN universal machine encompass, but are not limited to, those performed by many different vertebrate retinas ranging from salamanders to primates. All the functional properties of these retinas, as well as others that do not exist in nature, and other sensory organs can be implemented in the same CNN universal machine. These retinas, and other sensory organs, not only respond in specific ways to the sensory input, but they adjust their responsive properties to match the environment and the objective of the animal. All of these functions and the adjustments in function performed by biological sensors are also implementable in a CNN universal machine through its analogic (analog and logical) programming capability. The functional properties of the CNN universal machine are not built in (not hard wired) but can be programmed, and the programming can be self adapting, like the biological sensors themselves, such as a retina, to match the content and context of the visual and other sensory task.

In addition, because of its unique design, the CNN universal machine can perform both sensory processing and adaptive functions that go far beyond vertebrate sensors, both in their complexity, range of adaptability and speed of operation.

For example, the retina processes information sequentially across 5 sheets, or layers, of neurons, the CNN bionic eye can process information across a very large number of such layers in the same time period that a biological retina processes the same information, at least 10,000 such "slices" or processes within that time period. The biological retina adapts to a few important contexts of the visual scene, including brightness, texture and movement. The CNN universal machine bionic eye is capable of adapting to those and many more possible contexts, including those never even seen by biological retinas. The biological retina processes the visual scene in about 100 msec. The CNN bionic eye can perform these functions in less than one millionth of a second. Similar arguments are valid to other topographic sensory organs (tactile, somatosensory, olfactory, etc.).

The applications for the CNN bionic eye, or other CNN bionic sensors, are limitless. The CNN bionic eye is an image processing supercomputer, no larger than a thumbnail, and consuming minimal power. It is capable of processing a visual image in one millionth of a second, then store that image, be reprogrammed in a microsecond, and then process the stored image with no limit to the number of cycles that can be performed. Furthermore, the logical component in the global analogic program unit (GAPU) of the CNN universal machine allows the device to adapt to the context, as well as the content, of the visual scene.

The CNN bionic eye and other topographic sensors would therefore be invaluable in a variety of applications, of which a few are:

1) Serving as the "eye" for complex robotic vision systems capable of adapting to any given visual scene regardless of brightness texture, contrast, frequency of light or speed of movement;

2) Forming the front end of visual prosthetic devices designed to interface at virtually any level of the nervous system from the optic nerve to the visual cortex and beyond;

3) Satisfying a broad range of neuromorphic modeling objectives because the programming is so flexible and intuitive;

4) Serving as the front end of a "smart" video or still camera capable of dynamically adjusting contrast, color composition and movement sensitivity of the scene even before the image reaches either the photodetectors or the film; and 5) Serving as the lightweight, portable sensor in a form of bionic eyeglasses.

A key point of the implementation is that all the sensors are placed on, or in close proximity to, the chip. In addition to the photosensors, pressure, temperature, and chemical microsensors could also be placed on the chip, as well as others.

BRIEF DESCRIPTION OF THE DRAWINGS

FIG. 3b is an expanded block diagram of a single cell of the prior art CNN machine of FIG. 3a.

FIG. 3c is an expanded block diagram of the GAPU of the prior art CNN of FIG. 3a.

FIGS. 4a and 4b together present a schematic representation of an equivalent circuit of a single enhanced prior art CNN cell as in FIG. 3b.

FIG. 7b is a simplified functional schematic representation of the layers of the CNN universal machine programmed to simulate the processing of information by the various layers of the retina as shown in FIG. 7a.

FIG. 7c is a simplified functional block diagram of the operation of the CNN universal machine of FIG. 7b for simulation of the processing of information by the various layers of the retina of FIG. 7a.

DESCRIPTION OF THE PREFERRED EMBODIMENT

Summary of the Structure and Functions of a Representative Eye

It is well known that biological retinas consist of sheets, or layers, of neurons arranged in very large arrays. Each sheet consists of between $10^5$ to $10^6$ neurons with the number of neurons per sheet dramatically decreasing as one's attention moves from the outer most sheet to the inner most sheet. Therefore it can be said that the grain of the retina changes dramatically as the inner most sheet is approached.

Figure 6:
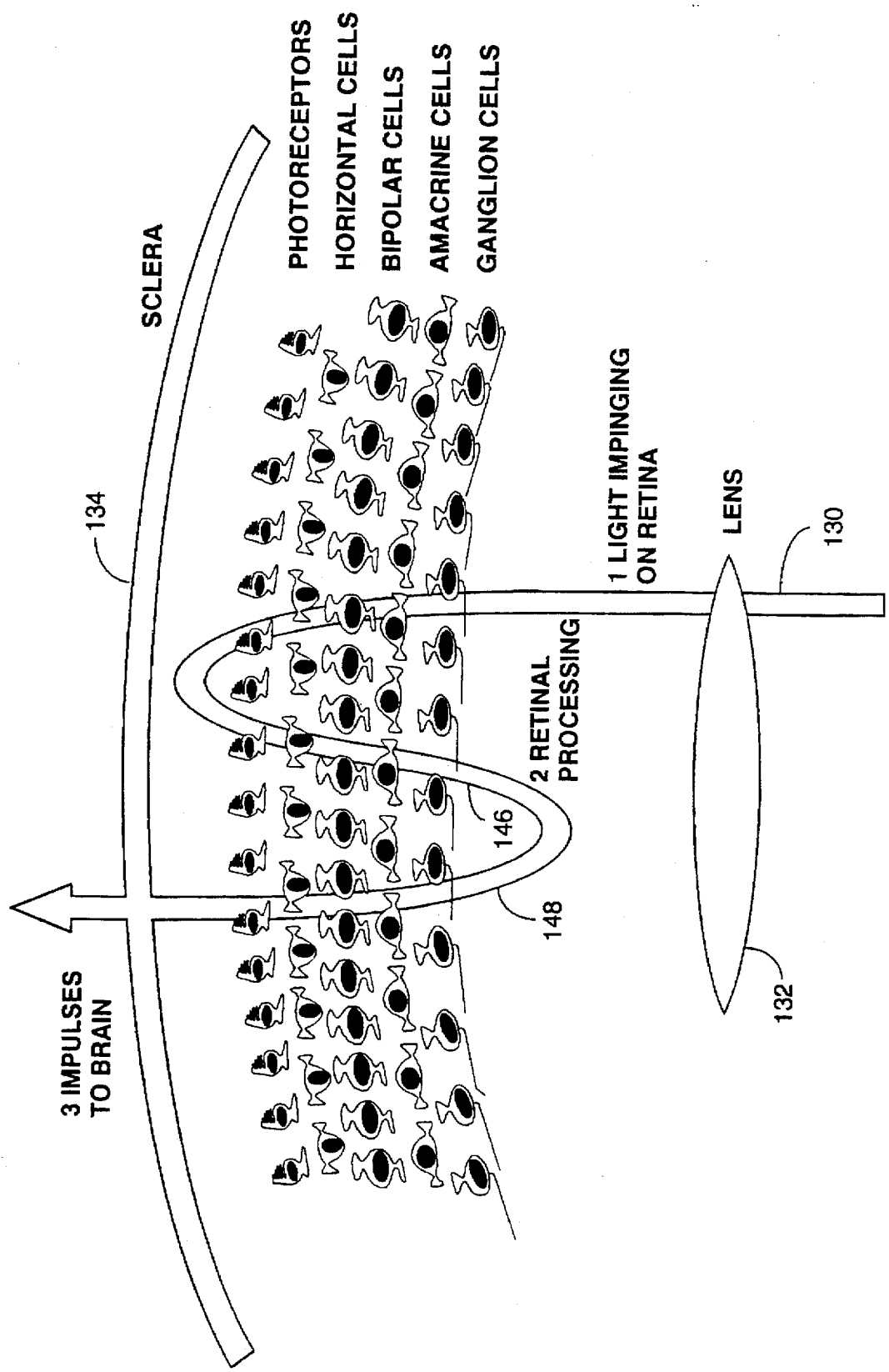
FIG. 6 is a simplified schematic representation of a representative eye and the layers of the retina.

Referring first to FIG. 6, there is shown a simplified schematic representation of a representative eye and the layers of the retina. At the top of FIG. 6 is the back wall, or sclera 134, of the eye, and at the bottom of the figure is the lens 132 on the front of the eye. The retina of the eye, which is physically located near the sclera 134, is made-up of a series of layers which face away from lens 132. Thus, the incoming light 130 enters the eye through lens 132, passes completely through the retina, and then is in essence reflected off the sclera 134 before it is processed by the retina layers.

In this representation there are five layers in the retina, and each layer processes the light information serially starting with the layer of photoreceptors 136 which is made-up of the rods and cones. This first layer is the only layer that actually interacts directly with the incoming light. Each of the remaining layers receives neurological impulses from the preceding layer, or layers, and it is those neurological impulses from the preceding layer that each subsequent layer operates on. Also, the deeper the layer of interest, the fewer cells that that layer contains, thus it is said that the "grain" of each layer increases the deeper the layer is. Stated another way, each cell in each subsequent layer of the retina receives its input signal from numerous cells (perhaps from 2 or 3 to 100, or more) in the previous layer of the retina.

Referring again to FIG. 6, following the layer of photoreceptors 136, the layers in order are the horizontal cells 138, the bipolar cells 140, the amacrine cells 142 and the ganglion cells 144, with each of these layers performing a different function and modifying the neurological signal 146 from the previous layer to form the output signal 148 that is presented to the brain for further processing. Thus it can be seen that the light and light information passes through the retina three times as signals 130, 146 and 148.

Figure 7A:
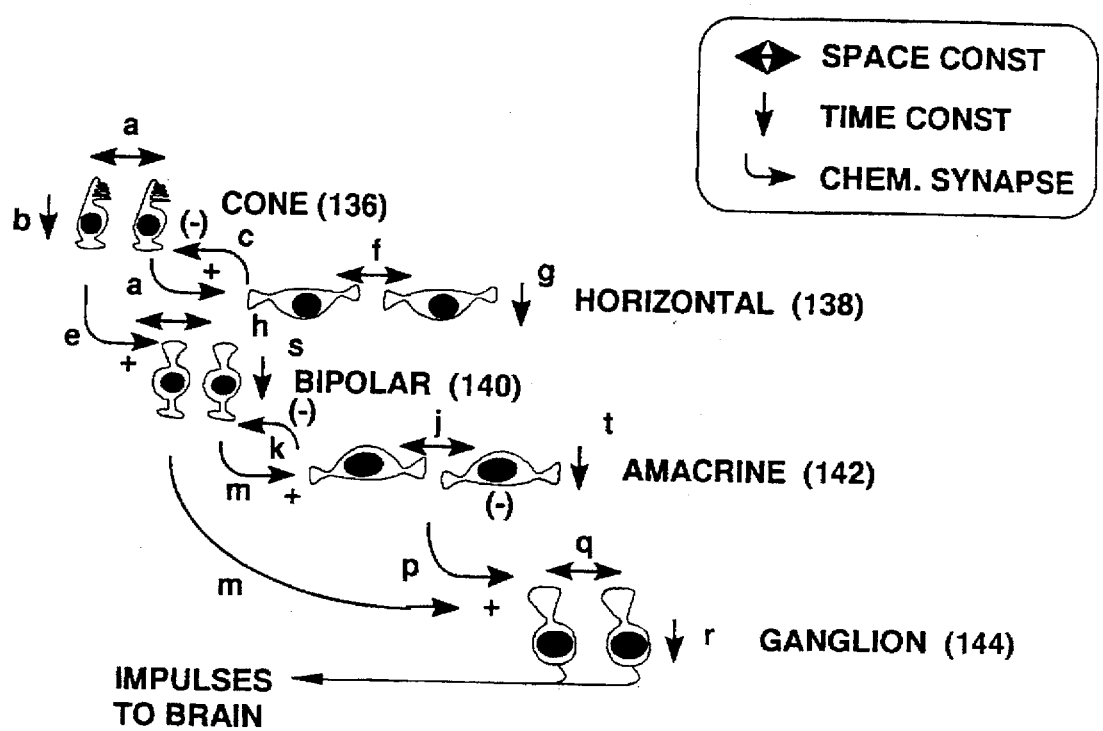
FIG. 7a is a functional schematic representation of the layers of the retina of a representative eye and the processing of information by the various layers.

Physiological recordings from intact retinas and retinal slices Have yielded the functional parameters that underlie retinal function. These functional parameters are summarized in FIG. 7a as 17 arrows, each representing a functional parameter of the eye. FIG. 7a also identifies the five layers illustrated in FIG. 6, and thus, FIG. 7a schematically illustrates the function performed by each layer of the retina and its immediate interaction with another layer or layers.

In FIG. 7a the vertical arrows represent time constants and the horizontal arrows represent space constants which only occur in a single layer, not between layers; and the curved arrows represent transfer functions between layers. These 17 parameters specify overall retinal function and are well known in the literature.

Modern retinal research is now beginning to uncover neuromodulatory modifications to basic retinal function, whereby the original functional parameters specified by the arrows in FIG. 7a are being modified as more is being learned about the micro-operations of the various layers of the eye. These modifications allow a given retina to perform in many different modes depending upon intrinsic or extrinsic conditions. For example, intrinsic conditions, are determined by the biological clock, and the animal's state of awareness; external conditions are determined by the context of the visual scene, i.e. the brightness or contrast within the scene.

In general terms, the 17 functions performed by the various layers of the eye are summarized below. First, the photoreceptors (136) transduce light and they become active neurally.

Next, the horizontal cells 138 average the activity at each point from input signals received from many-many rods and cones in the photoreceptor layer 136. Since each cell in layer 138 receives an input from many cells in layer 136, that averaged image from layer 136 per cell in layer 138 is going to be very blurred because many points converge on each one. If the original image is dynamic, the result here is also blurred in time by the averaging action.

The difference is then taken between the signals from the first and second functions. Thus, since the difference is being taken between a blurred image and a sharp image, the result is going to identify the edges of the original image of the incoming light 130. This difference taking, thus, enhances the edges and begins to bring out some of the details of the incoming image being received by lens 130.

Then the difference signal is emphasized which in essence turns up the gain at the edges of the original image. At this point (bipolar cells 140) there are two kinds of cells: one type looks at increases in lightness; and the other type looks at increases in darkness. Thinking of a boundary between light and dark, those two events are always going to be neighboring each other with the actual edge being the zero-crossing between them and not otherwise defined. This can be thought of as the second spacial derivative of the original image.

Up until this point, the retina has substantially been emphasizing spacial differences in the original image. At this point on the retina changes in time have been identified. As a result of the next operation, the only portion of the original image that produces a resulting signal here is that portion of the original image that is moving.

Next, there is a kind of averaging in time that takes place with the motion detected in the previous step appearing to be smeared out severely.

Then finally, the ganglion layer 144 gathers this activity with the final output consisting of the changes in time that have been identified the instant that they occur with the signal then being shut-off.

Summary of CNN Universal Machine and Supercomputer Architecture

Figure 1:
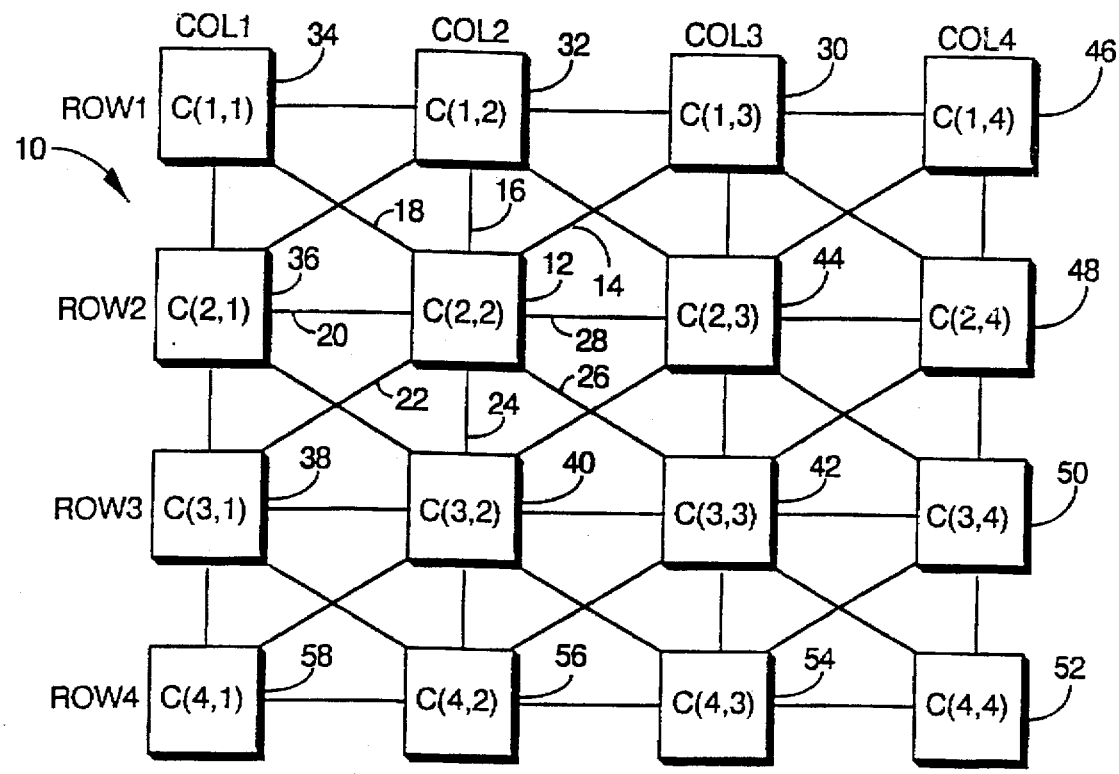
FIG. 1 is a two-dimensional simplified block schematic diagram of a single-layer cellular neural network of the prior art showing a CNN having the interconnections between cells being only to the nearest neighbors.

Referring to FIG. 1, there is shown a 4×4 two-dimensional cellular neural network of the prior art by way of illustration. The cells C(i,j) are shown here in a square array of four rows and four columns with "i" representing the row number and "j" representing the column number. In FIG. 1, there are sixteen cells each shown schematically as being interconnected only to its nearest neighbors, i.e., the first layer of neighbor cells. For example, cell 12 {C(2,2)} is shown interconnected with cells 30–44 by links 14–28, respectively. Each of links 14–28 shown here are bi-directional between the two cells to which that link is connected. In this example, there is only one layer of neighbor interconnects between the cells with cells 30–44 substantially forming a circle around cell 12. If there were a second layer of neighbor interconnects, cell 12 would similarly also be interconnected with cells 46–58. This layer of neighbor cells forms only a partial circle due to the limited size of the CNN in this example.

Figure 2:
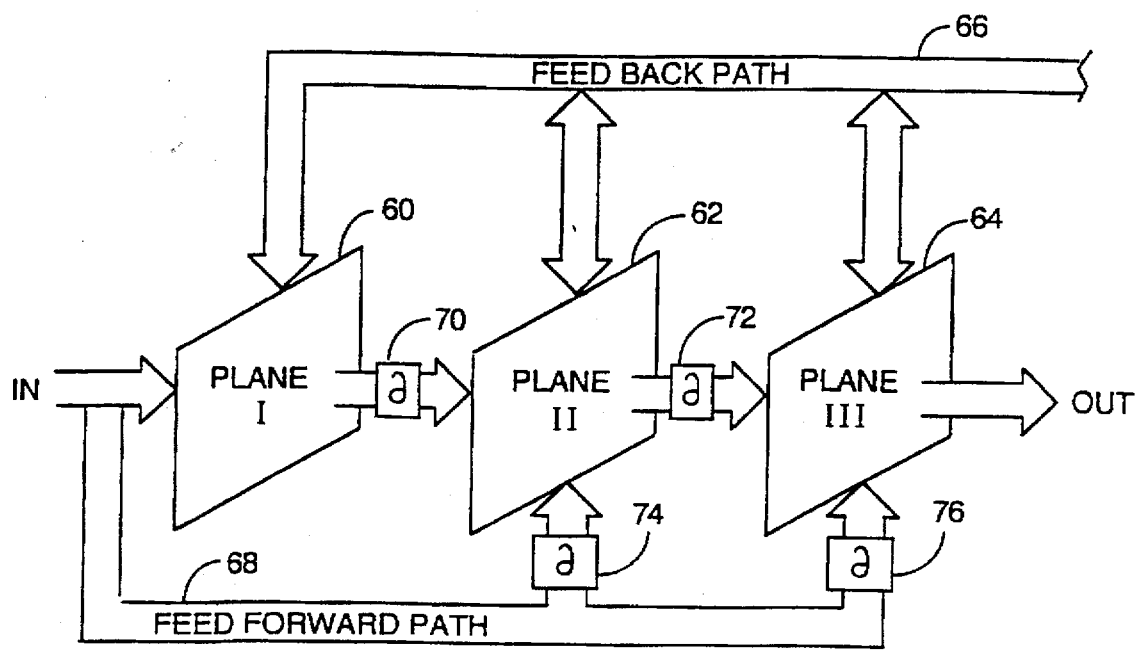
FIG. 2 is a block schematic representation of the interconnection between the layers of a multi-layer CNN of the prior art.

Referring to FIG. 2, there is shown a typical schematic representation of a multi-layer CNN of the prior art having layers 60–64. The input signal is shown being applied directly to layer 60 and feed forward path 68, and via delays 74 and 76 to layers 62 and 64, respectively. In addition, the output signal from layer 60 is applied to layer 62 via delay 70, and the output signal from layer 62 is applied to layer 64 via delay 72. Finally, the is a feedback path 66 for feeding back signals from layer 64 to layer 62, and from layer 62 to layer 60. In this implementation, the value of delay, δ, for each of delays 70–76 is substantially equal.

The CNN universal machine of the present invention provides at least three new capabilities; the analog stored program and the time-multiplex operation of layers, the wireless detection, and flexible representation of various PDEs using a chaos circuit.

First, the CNN can be defined as an analog cellular nonlinear dynamic processor array characterized by the following features:

(i) analog processors that process continuous signals, that are continuous-time or discrete time signals (i.e., the input, output, and state variables are $C^k$ functions at least for finite intervals), the processors are basically identical (a single term of them may vary regularly);

(ii) the processors are placed on a 3-dimensional geometric cellular grid (several 2-dimensional layers);

(iii) the interactions between the processors are mainly local, i.e., each processor is interacting with others within a finite neighborhood (nearest neighbor is just a special case), and mainly translation invariant defined by the cloning template (the dynamics of a given interaction may be a design parameter);

(iv) the mode of operation may be transient, equilibrium, periodic, chaotic, or combined with logic (without A-D conversion).

The original CNN array 10 (see FIG. 1), with some elementary logic additions, is used as a nucleus for the CNN Supercomputer with the following additional features and circuit elements being responsible for the universal capabilities of the CNN Supercomputer. Analog two or three dimensional array-signals which assume continuous values in continuous or discrete-time over an interval are used.

Figure 3A:
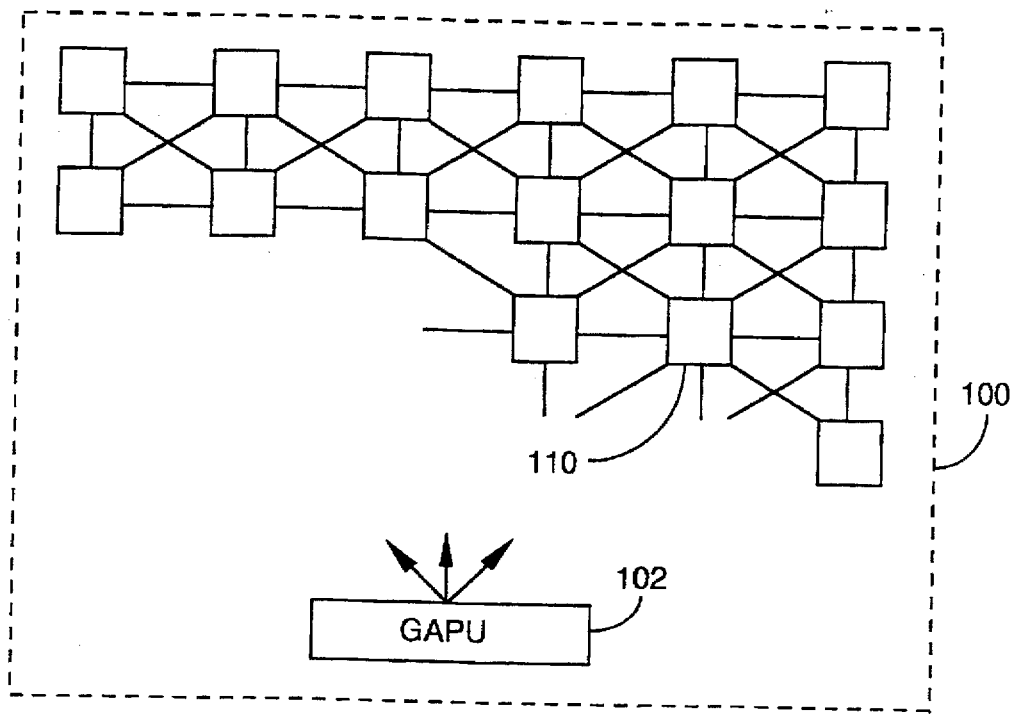
FIG. 3a is a graphical illustration of a layer of a universal CNN machine of the prior art.

Referring to FIG. 3a, there is shown a partial block diagram of the CNN universal chip 100. This chip architecture is divided into two distinct regions as shown in FIG. 3a. In the upper portion of FIG. 3a there is what appears to be the CNN structure shown in FIG. 1, and in the lower portion there is a block representation of the global analogical programming unit (GAPU) 102 which is discussed further below.

As is well known in the CNN art, the grid of individual cells 110 as shown in FIG. 3a as being rectangular, could be any two-dimensional configuration (triangular, hexagonal, polygonal, etc.). This is more application dependent than theory dependent. Additionally, different grid sizes and shapes can be used for different layers in a multi-layer CNN.

A connection radius of r=1 is shown in the upper portion of FIG. 3a for simplicity. It should be understood that, without loss of generality, larger radius values can be implemented in the same way to increase the connection density as necessary.

In fact, the universal chip architecture illustrated in FIG. 3a represents the functional architecture of the CNN universal machine in two senses: (1) several CNN universal chips 100 (e.g. layers 60-64 in FIG. 2) stacked upon each other results in a three dimensional universal CNN machine, and (2) several two-dimensional "layers" (as in FIG. 1) of a three-dimensional CNN machine can be implemented on the CNN universal chip architecture with time multiplexing using local analog and logic memory registers. To further broaden the cell capacity of a physical CNN universal chip, several chips can be placed next to each other on a planar substrate with only the border cells on one chip connected to border cells on an adjacent chip as if all of the cells had been on the same larger chip. If the feedback/feedforward signals of the CNN are to be connected to more than just the nearest circle of neighbor cells then the border cells of each of the adjacent cells would also have to be connected to the appropriate additional cells on each chip as if those cells were each on the same chip.

Figure 3B:
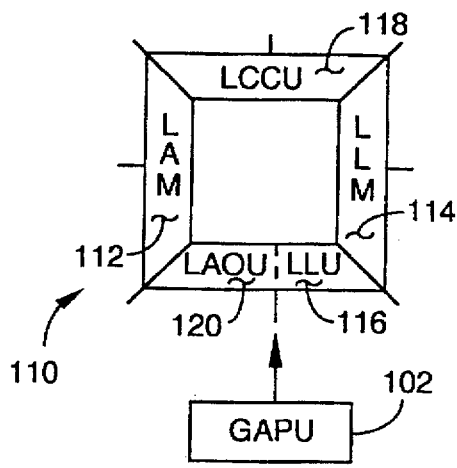

An expanded view of any and every CNN cell 110 of FIG. 3a is shown in more detail in FIG. 3b. In addition to the nucleus of the single cell which is equivalent to the basic CNN cell, there are several additional analog and logical circuit elements associated with each cell. It should be noted here that "logical" and "digital" are not to be equated with each other. A digital circuit includes various gates and registers, whereas a logical circuit is an analog circuit that processes logical values without doing so with conventional digital building blocks.

The additional circuit elements in each cell of the CNN universal machine are a local analog memory unit (LAM) 112, a local logic memory register (LLM) 114, a local logic unit (LLU) 116, a local communications and control unit (LCCU) 118, and a local analog output unit (LAOU) 120. In operation the LAM 112 cell values are combined by the LAOU 120 while the logic register values are combined by the LLU 116. The LCCU 118 provides the control of the cell configuration and the analog and logic instruction communication. The operation of the enhanced universal CNN cell and each of these elements is discussed in greater detail with respect to FIGS. 4a and 4b below.

Figure 3C:
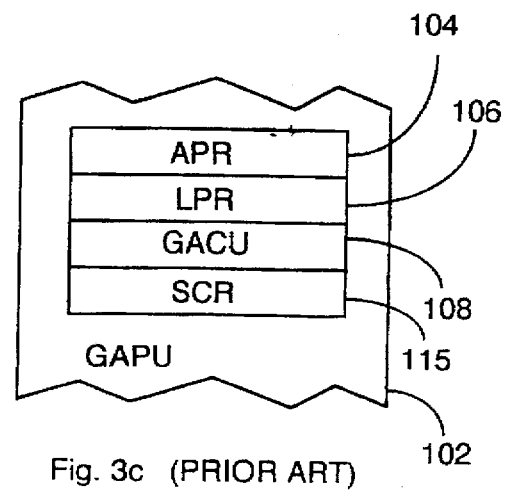

The global analogical programming unit (GAPU) 102 controls the entire cell and is shown in more detail in FIG. 3c. Here it can be seen that GAPU 102 has three constituent parts, an analog program register (APR) 104, a logical program register (LPR) 106, and a global analogical control unit (GACU) 108. Thus it can be seen that GAPU 102 is a "dual" unit with both analog and logical components, but without A-D converters. It is used to control the identical functions of all cells and the sequences of these functions, namely:

the analog template elements;

the function of LLU 116;

the cell configurations (including the selection within LAOU 120);

the start of the different units.

The operation of GAPU 102 and each of the elements that it contains will be discussed in relation to FIG. 5 below.

If the implementation of the overall CNN universal machine is done on a single chip, then several of GAPUs 102 can be used in an array partitioning GAPU 102 between the chips working together with a central GAPU 102. In such an implementation APR 104 can also be divided to form an analog cache register.

FIGS. 4a and 4b together present a schematic diagram of an equivalent circuit representation of a typical individual cell 110 (see FIG. 3b). In this diagram the suffixes u, x and y denote the input, state and output, respectively, of the cell. Additionally, node voltage $v_{xij}$ is called the state of the cell, node voltage $v_{uij}$ is called the input of the cell, the node voltage $V_{yij}$ is called the output of the analog portion of the cell, and $Y_{ij}$ is the logical output of the cell.

Templates A and B define the feedback and feedforward, respectively, between neighbor cells and are programmable via GAPU 102. They each contain variable gain amplifiers with the gain values being received externally. At the input, sequentially, various values of node voltage $v_{uij}$, the input signals, are stored as analog signals locally in LAM 1 $112^1$. Similarly, the initial state, $v_{xij}(0)$, is also stored locally as an analog signal in LAM2 $112^2$, and subsequent state values are store sequentially as analog signals in LAM3 $112^3$. Finally, several consecutive output values, $v_{yij}$, are stored as analog signal in LAM4 $112^4$. Once at least one result is present in LAM4 $112^4$, it can be used as an input or initial state to LAOU 120, meanwhile different B and A templates can be programmed to calculate iterative instructions. In very high speed applications LAM4 $112^4$ could be an analog delay line. Now, after several consecutive results have been sorted in LAM4, $112^4$, they are combined by LAOU 120 to calculate an output value, $v^*_{yij}$. For example, LAOU 120 could be a diode or a small amplifier which adds the analog values from LAM4 $112^4$. One implementation of LAMs 112 could be capacitors on which the analog voltage can be stored.

In the local analog memory (LAM) $112^x$, in addition to the local input, state, and output memory elements, some additional output memory cells are used in LAM4 $112^4$. These additional output memory cells provide for the application of a local analog output unit (LAOU 120) where the analog memory values are combined by simple analog circuits (using programmable switches one particular operator can be selected). These elements can also be used (in an analogical algorithm) for the implementation of branching into several parallel branches (time multiplexing with analog signal values).

From the analog portion of the CNN of the present invention that is shown in FIG. 4a the signal $v^*_{yij}$, in FIG. 4b, is applied to a simple bipolar/unipolar shift unit 122 transforms the analog output to logic values with consecutive values being stored in a local logic memory register (LLM 114 which may be implemented, for example, by a multi-stage analog shift register where the converted logic signals are stored in analog form (just yes or no). Having several consecutive logic values stored in LLM 114 allows for the implementations of branching in the analogical algorithms (at logic signal arrays).

The results stored in LLM 114 are then combined in LLU 116. LLU 116 is programmable to combine the logic values stored in LLM 114 into a single output. Further, LLU 116 is programmable from GAPU 102 and may be implemented, for example, e.g., as a memory or a PLA. Thus the logical output signal, $Y_{ij}$, provides a "yes" or "no" response to whether the feature that the CNN was programmed to detect by templates A and B was observed. For example, vertical edges and corners and where they occurred might be detected. The analog-logical (analogical) processing, as illustrated in FIGS. 4a and 4b, is serial with the analog processing performed first followed by the logical processing.

Throughout the analogical processing discussed above with respect to FIGS. 4a and 4b, LCCU 118 controls the timing of the various steps in the processing by means of a series of switches that are controlled by GAPU 102. These switches interface with the various elements of FIG. 4a via the broken line segments shown in that figure thus controlling the operation of LAMs 112. The switches of LCCU 118 can be implemented several ways including, for example, MOS transistors or SCRs, with the switches being locally the same in each cell.

These configurations are the same for all cells. If there is a global control unit which sends the switch configurations to each cell, the same binary switch configuration code is sent to each cell. Then when the next instruction comes a different switch configuration code will be sent.

In the previous design of the original CNN it was necessary to have multiple layers, each working in parallel and each looking for the occurrence of a different feature. This approach is still possible with the universal CNN, however, since the universal CNN is programmable it is possible to use the same hardware to search for different features in a serial mode which greatly reduces the interface hardware necessary for implementation of the universal CNN supercomputer where all of the necessary functions can be performed serially within the available time. Since the CNN supercomputer operates in very fast in real time, and if there are five things that need to be searched for, the CNN supercomputer is cycled through five times. The key here is that it is so fast that it appears to be nearly instantaneous. When there are so many steps that have to be performed within a fixed amount of time, it may still be necessary to use multiple layers of the universal CNN supercomputer that function in parallel.

Since the CNN supercomputer employees multiplexing and the results are locally stored in each layer, the results from several layers that have been processed simultaneously can be combined with no communication cost since everything is locally stored. This is key. Also analog signals are used so that there is no need for A-D conversions in each cell; the actual signals are stored. The local connectivity here provides a high speed supercomputer that is very small and uses very little power.

Figure 5:
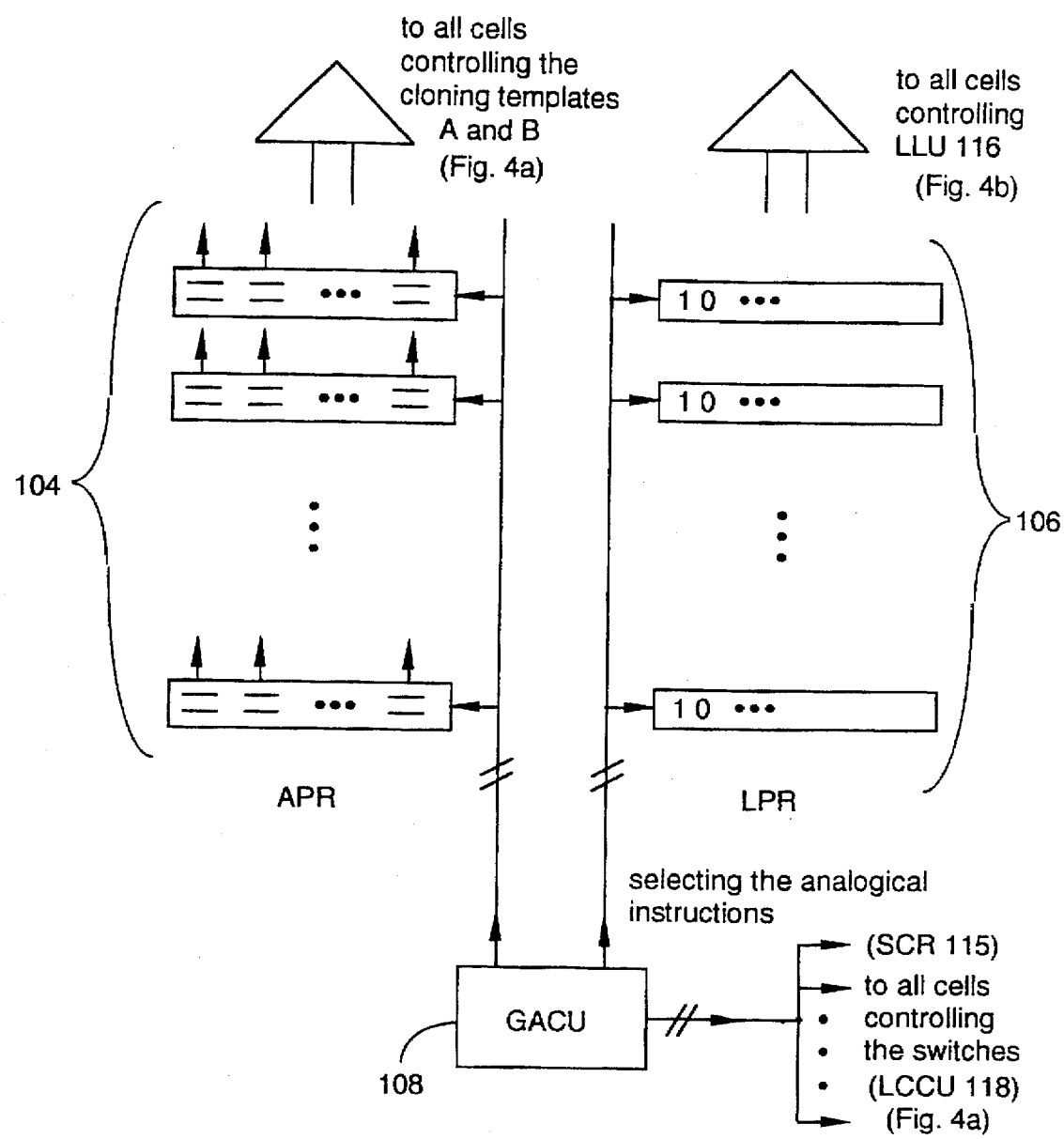
FIG. 5 is an expanded block diagram representation of GAPU of FIG. 3c.

FIG. 5 is a block diagram representation of GAPU 102 which as stated in relation to FIG. 3c has three parts:

the global analog program register (APR) 104 for storing the analog programming instructions and different templates for each cell which are the same for each cell (e.g. by using capacitor arrays);

the global logic program register (LPR) 106 for storing the different logic programming instruction and codes of LLU 116 (same for all cells in the layer); and the global analogical control unit (GACU) 108 which controls )the overall timing for the CNN layer and when each instruction from APR 104 and LPR 106 are entered into LAM 112 and LLU 116, respectively of each cell (the control sequences stored here represent the analogical machine codes of the analogical CNN algorithm) with the use of two global clocks, one determined by the analog dynamics and the other determined by the logic units.

To overcome the on-chip size limitations of these 3 subunits, especially the size limitations of APR 104, the division of the on-chip and off-chip analog program storage can be arranged to introduce analog-cache storage (ACS) as well to supplement the on-chip APR 104 storage.

The analogical CNN algorithms can be described by an analogical CNN language (or an equivalent block diagram). This language is translated by a computer to the analogical CNN machine code.

In most applications the radius of interconnects with each CNN will be equal to 1, thus there will be no more than 19 individual instructions to be stored in the registers of APR 104, thus 19 numbers will be enough to fully address the processor. Each of the APR 104 registers of FIG. 5 represent different analog instructions. These instructions consist of all of the possible values for each of the A and B templates, as well as the bias current, I. The bias current can also be thought of as a threshold. Each contains an instruction to program the individual templates: "A" with 9 numbers (3×3 matrix with values for feedback to the connected cells of the CNN), "B" with 9 numbers (3×3 matrix with values for feedforward to the connected cells of the CNN), and "I" with 1 number for the bias current of the single cell itself. Similarly, if r=2 then 51 numbers will be needed since the "A" and "B" templates each will be 5×5, if r=3 then 99 numbers since the "A" and "B" templates each will be 7×7, etc.

Similarly the size and number of each register in LPR 106 is dependent upon the number of logic values to be combined and the number of different logic instructions.

The selection of the appropriate analog templates, i.e. analog instructions, and the logical instructions is made by GACU 108. Suppose the next instruction is a corner detecting template. GAPU 108 then loads to the local programming values of the "A", "B" and "I" templates. Like in digital microprocessors the contour here is organized in the sequence of the data and instructions. GAPU 108 is a sequential logical store of which instructions to select and in what order from APR 104 and LPR 106 to detect the desired pattern, etc.

Considering the standard fully connected analog neural networks, it is obvious that the latter condition is unimplementable. Partly because the storage space of a single program "instruction" is prohibitively large, partly because the reprogramability takes more time than the execution time itself. This is a point where the local connectivity comes into the picture. Namely, if a CNN cloning template is considered an analog instruction, then there are only one or two dozen analog values for an instruction to be stored even if there are thousands of processors. Conversely, in the case of a fully connected analog synchronous neural network (e.g., the Intel 80170), there are about 10,000 analog values for 64 processors and their reprogramability takes considerable time. In addition, the possibility of using different artificial dynamic systems, or circuits, as cells (e.g. a chaos circuit), makes the array used in the present invention extremely flexible.

CNN Implementation of the Retina—The CNN Bionic Eye

In order to implement retinal function in a CNN universal machine, the time and space constants, as well as the transfer functions, and modes of adaptive behavior for retinal image processing must be identified from the data gather through years of biological research that is already available in the published literature and are summarized in the 17 parameters displayed diagrammatically in FIG. 7a. Given these physiological and physical parameters, the CNN templates, etc., can be derived and then programmed into the CNN universal machine in the following ways. The key is how to translate them into the CNN universal chip. The CNN literature contains several papers on the "learning" aspects of CNN to relatively automatically generate the necessary "A" and "B" templates to perform desired function. Additionally, also in the literature, some of the published biological models contain matrices to explain various operations of sensory organs which can be used will little variation to program certain functions in the CNN universal machine.

In addition to the identification of the basic CNN structure, the following design steps are essential:

1. Time constants and delays are defined for the CNN universal machine by controllable capacitors, small delay circuits, and by analogic programs for modifying both global and local time constants;
2. Spatio-temporal properties are identified by specific CNN template design methods for embedding the space-time parameters derived from retinal function in the CNN universal machine (there are two template design strategies based on single and multiple point measurements—in the single point case the excitation place corresponds to the template element location, while in the multiple point case a learning algorithm is used);
3. Programmable compression and extension techniques are used for matching the "grain" of the CNN universal machine elements in a particular operation simulation to the grain of the neurons of the retina or other sensor at the various retinal layers; and
4. The programming of the global analogic program unit ((GAPU 102 in FIG. 3a) for including the adaptive properties of retinal, or other sensory, function.

Combining several CNN simulated retinas for more complex tasks by using the analogic software of the CNN universal chips are the next level of the design. In addition, several different topographic sensory modalities can also be combined.

The CNN universal machine is powerful and flexible enough to be used to match the function of all known vertebrate retinas, and can easily perform other functions that go far beyond biological possibilities.

For example the basic functions of contrast detection, color coding, movement detection, directional selectivity can be easily performed by the CNN universal machine on a single chip just by programming using analogic software. Most important, these functional properties can be modified according to the brightness, texture, contrast and rate of movement in the visual scene, and this modification can take place either locally or globally. In this way the CNN universal machine can be programmed to operate at the most efficient level as determined by both the instantaneous visual scene and the long range visual goal.

An example of the capabilities of the CNN universal machine which lends itself to use as a bionic eye is illustrated in the composite of 11 different projections of the same input image (upper left) in FIG. 9 using 11 different analogic instructions, with any or all of these projections being generated and stored in memory within microseconds. Just as easily and quickly, any one of these images could have been used as the input image for the next operation, as occurs in the retina of an eye.

Transferring the Architecture from the Published Physiological Databank to CNN Universal Machine The CNN bionic eye is programmed using the known physiological parameters and models of retinal function. Physiological recordings from intact retinas and retinal slices have yielded the functional parameters that underlie retinal function. FIG. 7a, as discussed above, shows a schematic diagram of the retina, along with 17 arrows, each representing a functional parameter. This structure forms the basis of the implementation of a CNN bionic eye. The vertical arrows represent time constants, the horizontal arrows represent spacial constants, and the curved arrows represent transfer functions. This set of parameters specifies overall retinal function which has been illustrated in the literature by implementation on a digital image processor.

Modern retinal research is now beginning to uncover neuromodulatory modifications to basic retinal function, whereby the original functional parameters specified by the arrows in FIG. 7a can be further modified to further enhance effective bionic implementation of retinal function. These modifications allow a given retina to perform in many different modes depending upon intrinsic or extrinsic conditions. For example, intrinsic conditions are determined by the biological clock, and the animal's state of awareness; extrinsic conditions are determined by the context of the visual scene, i.e. the brightness or contrast within the scene.

The CNN bionic eye can also adjust to both intrinsic and extrinsic properties of the visual scene. By basing the programming of the CNN bionic eye on physiological parameters, the bionic eye will be endowed with the instantaneous performance characteristics that follow biological retinal function. These characteristics are further subject to modulation as a function of extrinsic properties via the global analogic program unit (GAPU 102 in FIG. 3a), similar to the way biological retinas modulate performance characteristics.

Figure 9A:
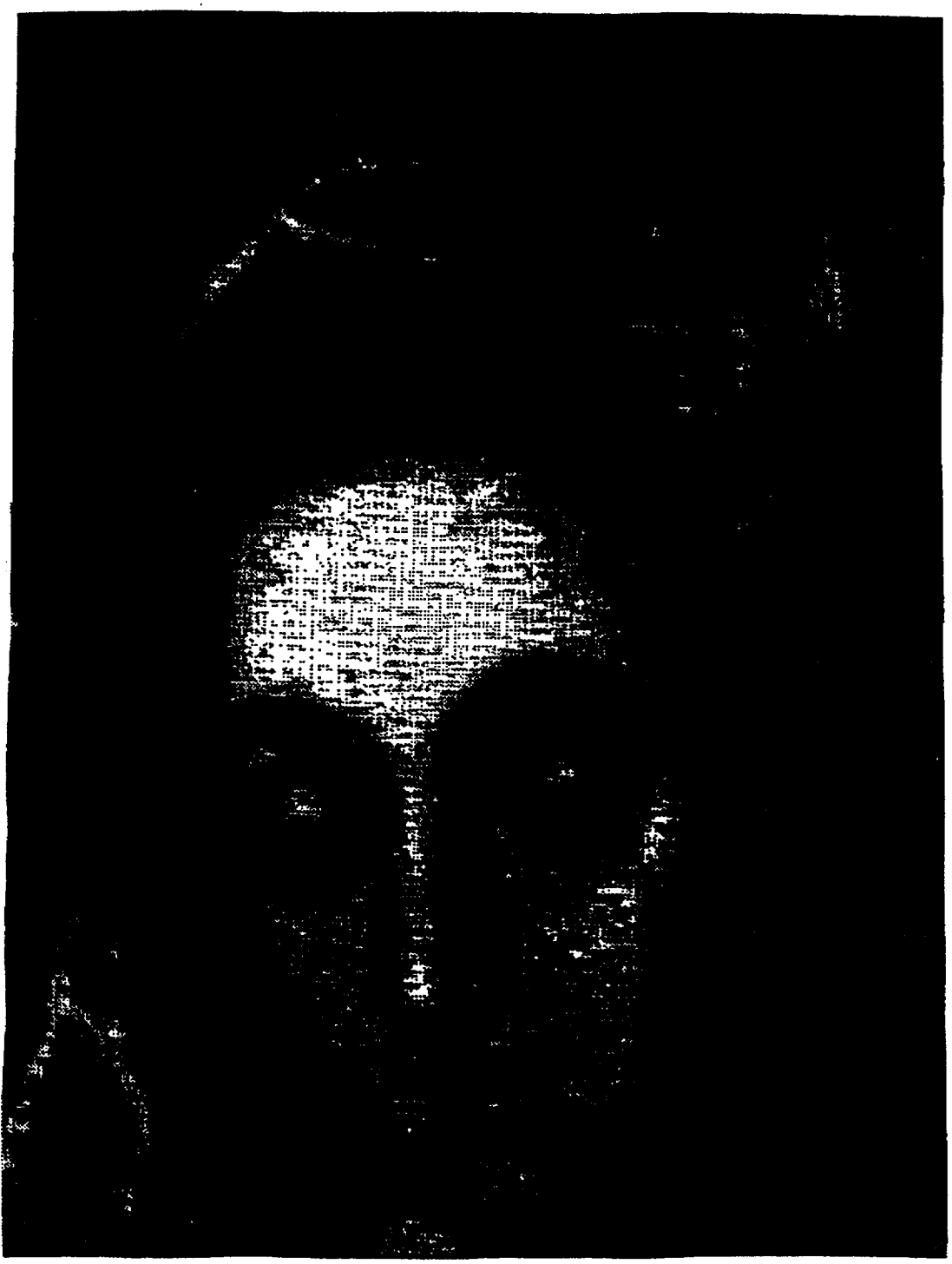
FIGS. 9a–9h are an original gray scale image is mapped into several other images by a CNN universal machine from the original gray scale image of FIG. 9a using different analogic programming templates.
Figure 9B:
Figure 9C:
Figure 9D:
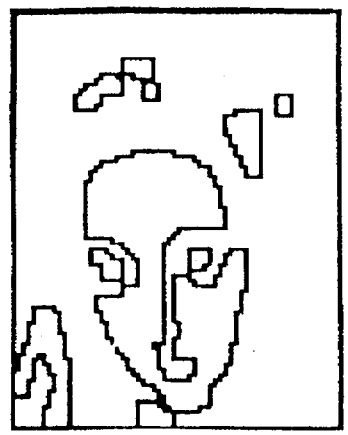
Figure 9E:
Figure 9F:
Figure 9G:
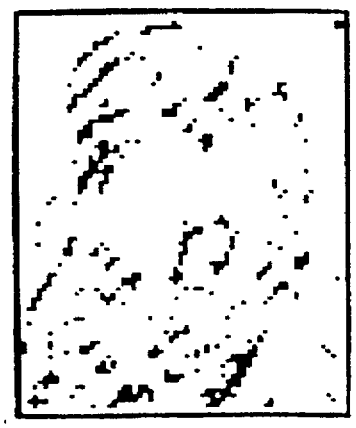

FIG. 9a shows an original gray scale image that was processed by the CNN universal machine with different "A", "B" and "T" templates as shown in Table I to generate FIGS. 9b–h. Briefly:

FIG. 9b is derived from FIG. 9a using a half-toning set of templates;

FIG. 9c is derived from FIG. 9a using an averaging set of templates;

FIG. 9d is derived from FIG. 9c using an edge set of templates;

FIG. 9e is derived from FIG. 9a using an on-center, off-surround set of templates;

FIG. 9f is derived from FIG. 9a using a diaggrey 135 set of templates;

FIG. 9g is derived from FIG. 9a using a diaggrey 45 set of; templates; and

Figure 9H:

FIG. 9h is derived from FIGS. 9f and 9g using a logic set of templates.

In summary, the CNN layer and interconnection architecture is started by a multilayer CNN with as many layers as physiological ones. The template structure is derived to mimic directly the receptive field organizations of the retina. In the case of between-layer feedback, all layers which are involved should be considered together. Feedforward layers are considered sequentially, by time multiplexing the consecutive layers in a programmable way. If more than one layer is connected by feedback, complex CNN cells are used in the physical CNN implementation.

Implementing the Physiologically Faithful Space-Time Parameters and Interaction Characteristics In order to implement retinal parameters in a CNN universal machine, the sites of interconnections, the interactions (transfer functions), and nonlinear dynamics between all elements must be specified. Unlike phenomenological models (which can also be modelled by CNN universal chips), here the physiologically faithful models are represented on a CNN universal chip.

1). Basic time constants and delays of retinal function are set by the controllable capacitive concept or by analogic programs.

2). The space constants and spatio-temporal interactions of retinal function or other sensory modality are set by programmable "templates" that define the interconnections between layers and cells in the CNN. (Two design methods are specified).

3) There is a form of layer compression; in the retina, over 1 million photoreceptors converge to less than 10,000 output cells. Therefore the CNN universal machine must be capable of layer compression. The compression of layers is accomplished by deleting or time-multiplexing rows/columns in the CNN layer grid by modifying the analogic program.

4) The adaptive properties of retinal (or other sensory) function, whereby retinal parameters are modified to accommodate different scenarios or processing goals, are implemented by the analog capacitive and logic bi-stable storage in the global analogic program unit (GAPU 102 in FIG. 3a) of the CNN universal machine. These adaptations can be programmed based on either content or context.

Even the switch between different retina models can be performed adaptively.

Design Innovations in Detail

The CNN universal machine has the computational power to perform highly complex processing of visual images with great speed, consuming little power, while only occupying the space of a computer chip. The programming of the operation of a CNN has great flexibility. It can be externally programmed to perform an enormous variety of image processing functions, feed the results of its processing back to itself so that it can reprogram itself to adapt to different qualities of the image or scene, and its operation can be reset as a function of the requirements of its host.

In order to implement the CNN universal machine as a CNN bionic eye, some key design additions, listed above, must be made to the design. These are as follows.

Controllable R-C Time Constants and Time Delays

Biological retinas act primarily to abstract information about the dynamics of the visual scene. Movement, direction of movement, onset and termination of local and global events, expanding and contracting images associated with, for example, approaching targets, are all common elements of visual function. In order to adequately and efficiently process the dynamics of the visual scene with an electronic model, a time delay is sometimes necessary between various functions, or steps in the process. When the necessary time delay is relatively short at a particular equivalent CNN layer, or a complex CNN layer that simulates the function of more than one layer of a retina, a controllable capacitor in an R-C circuit or an FET can be included on the CNN bionic eye chip to provide the ability to provide a programmed variable time delay. For global and longer time delays than are feasible with capacitors because of their necessary size, the time delay can be programmed into the operational routine and stored in the local analog memory of the affected CNN cells (LAM 112 of FIG. 3b). Thus, by using one of the two implementations of delays discussed above, it is possible to modify global time constants and/or time delays of different CNN layers, or to modify the time constants and/or time delays at local positions. All of these time constants and time delays being programmable, therefore, they too can contribute to the adaptational properties of the CNN bionic eye.

Figure 8A:
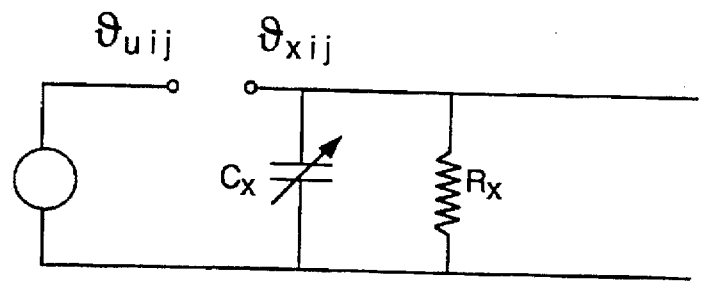
FIG. 8a is a schematic representation of the inclusion of a variable capacitance within each CNN cell.
Figure 8B:
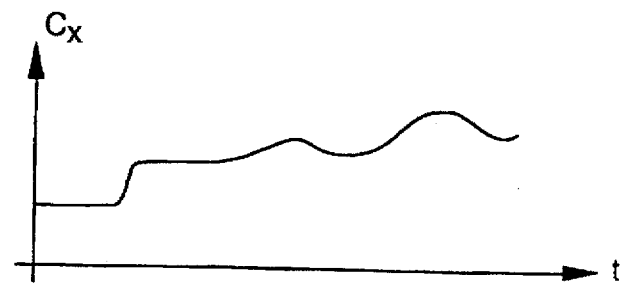
FIG. 8b is a graphical representation of the capacitance value with respect to time of a programmably variable capacitor.

Identical controllable capacitors, $C_x$, can be placed on the CNN chip to control the speed of the basic dynamics (the time constant) of the CNN array. FIG. 8a illustrates the placement of the capacitor, $C_x$, in the front end of the individual CNN circuit of FIG. 4a. The capacitors, $C_x$, may vary in a preprogrammed way (part of an analogic program of the CNN) or continuously depending upon the local output voltages of CNN cells on different layers see FIG. 8b).

Figure 8C:
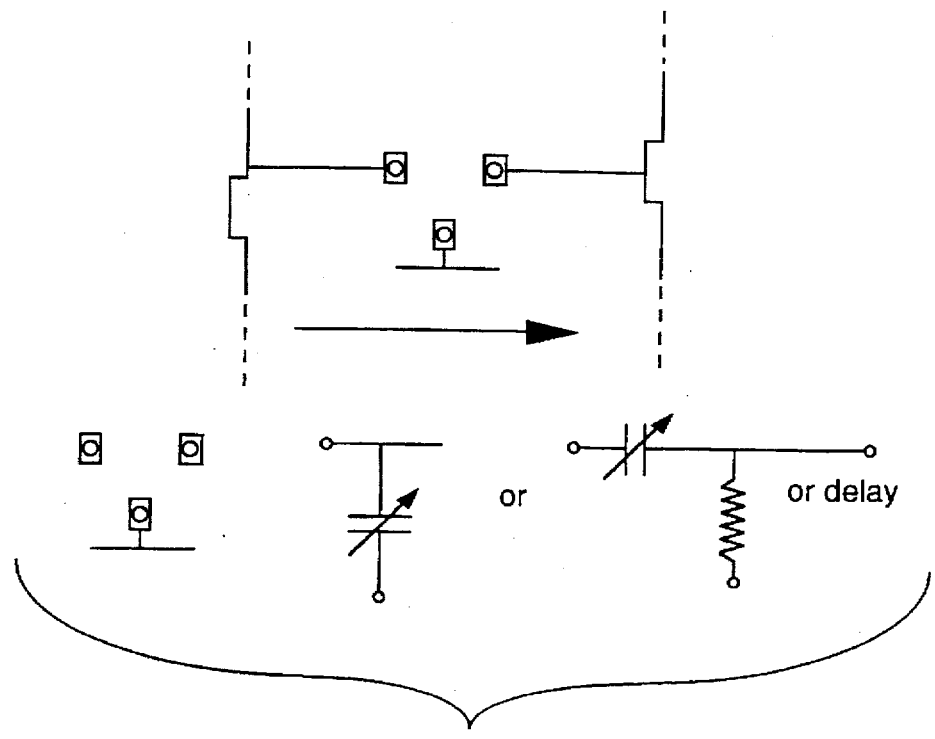
FIG. 8c is a schematic representation of the inclusion of a time-delay circuit, such as a variable capacitance in an R-C circuit, in the signal transmission path between two CNN layers.

Controllable capacitors can also be used to change the time delay of a template element. FIG. 8c shows a circuit implementation in the transmission path between CNN layers with a variable capacitor or delay-line inserted in that path. Hence, different delay values between the CNN layers and in the different positions of either "A" or "B" template can be implemented. Delay templates can also be useful in many motion-related applications.

Thus, if the capacitive variation can be controlled by a change in voltage level, the time constant can easily be implemented on an IC (CNN universal machine). This provides the option of placing a variable capacitor, or other time delay mechanism, on the Si chip itself and simply varying the delay time by programmably varying a control voltage level.

For larger delay values (compared to the "R-C time constant" discussed above) the local analog memory cells (LAM 112 of FIG. 3b) can be used to store a signal value that is applied to the appropriate CNN layer by the analogic program at the appropriate time. In this case a second "A" or "B" template circuit (bank of OTAs—Operational Transconductance Amplifiers) can be implemented, switching them in under the control of programmable switches, as part of the switch configuration of the CNN universal chip. If more than one layer is to be effected in the same way or at the same time, then those CNN cells can be placed on a single physical layer as complex CNN cells.

Identifying the CNN Templates Based on Measurements in the Living Retina

The key to making the CNN perform like a biological retina is to create a correspondence between the CNN templates and measured interactions in living retinas. Rather than defining the properties of individual cells, information about retinal networks has been extracted from the literature. Spatial interactions are defined in terms of a "space constant" that describes the lateral spread or diffusion of activity. This diffusion is then incorporated into the design of the cloning template of the CNN. Similar procedures are followed for implementing time constants and transfer functions for the bionic eye. The 17 parameters that constitute the design properties of the retina are illustrated in FIG. 7a above.

Figure 7B:
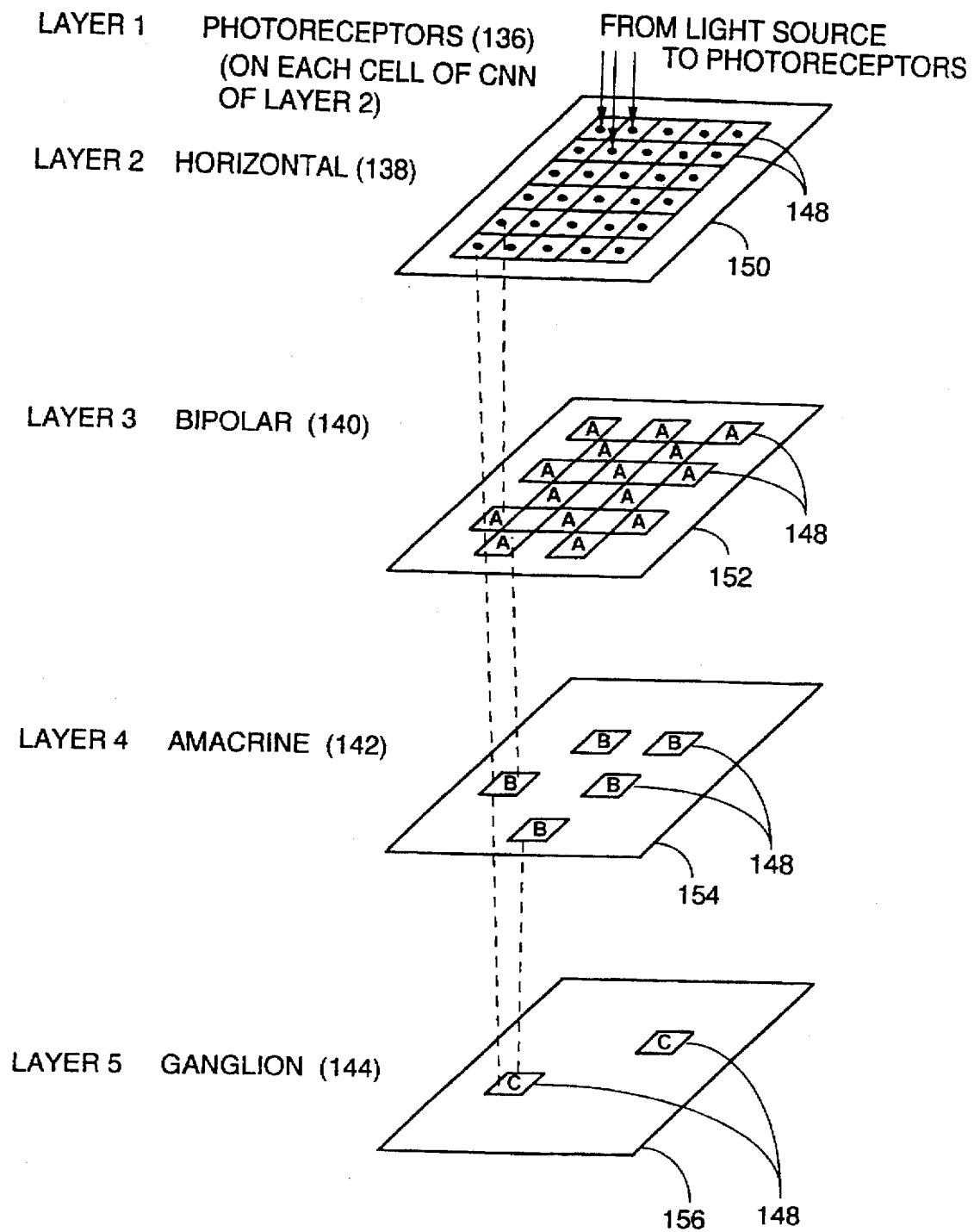

FIG. 7b is a simplified functional schematic representation of the layers of the CNN universal machine programmed to simulate the processing of information by the various layers of the retina as shown in FIG. 7a. In FIG. 7b Layers 2–5 (138–144) of FIG. 7a are illustrated as individual CNN Layers 150–156 and identified on the left with the same terminology used in FIG. 7a. Layer 1 (136) of FIG. 7a is illustrated here as the photoreceptors that gather the image and apply it to the layer of horizontal cells 138 in the retina, represented here as CNN cells 150 in Layer 2. Also, as discussed in relation to the operation of the retina where there are fewer and fewer operational cells in each layer of the retina as the signals progress from the first layer to the fifth layer, for illustrative purposes that reduction in the number of cell layer by layer is shown by there being only half as many CNN cell 150 being shown in each layer compared to the number of cells in the previous layer. The factor of ½ was selected only for representational purposes when in actuality the variation from layer to layer varies, and it varies from animal to animal.

Figure 7C:
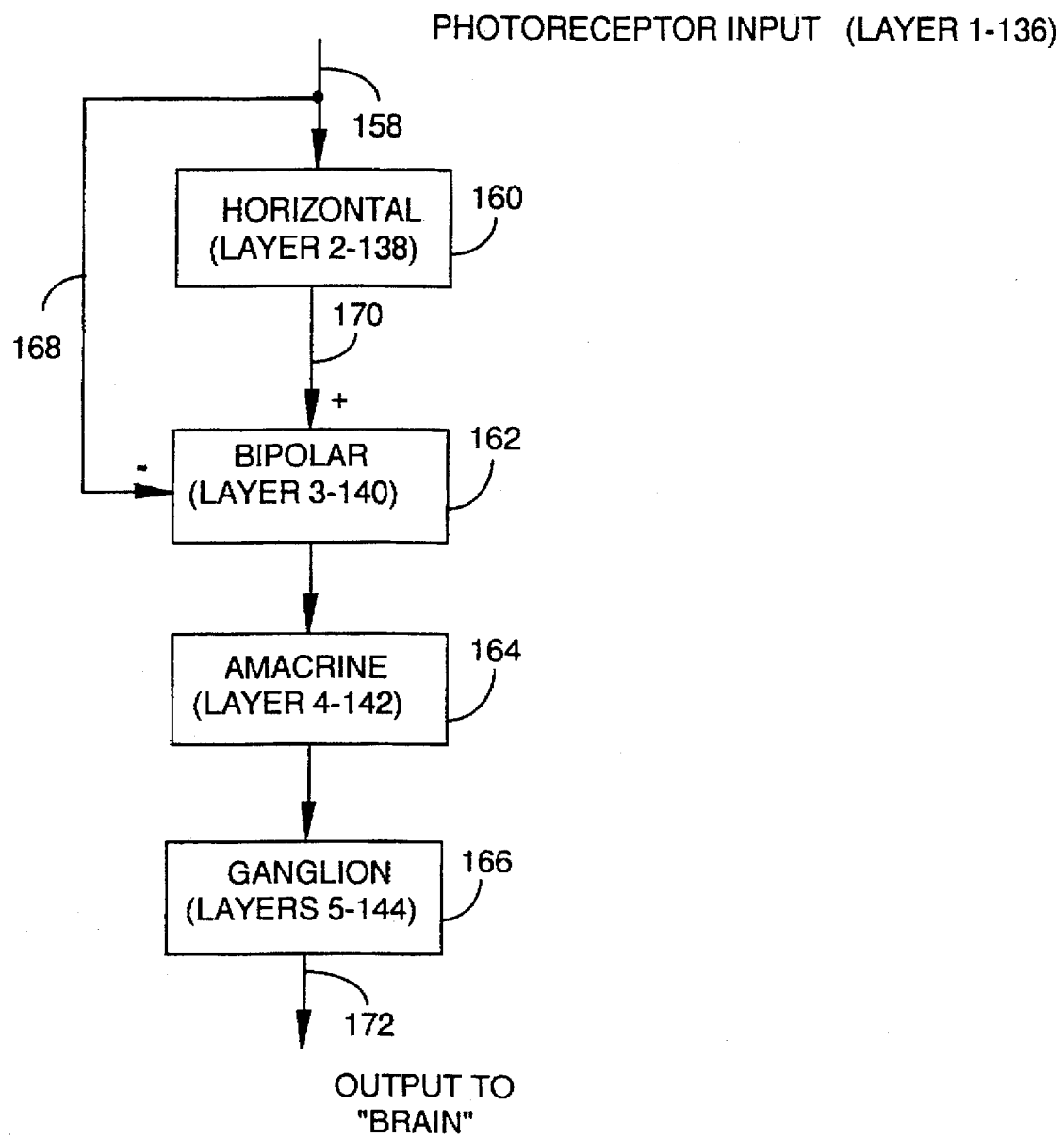

FIG. 7c then shows the corresponding functional block diagram of the operation of the simplified CNN universal machine of FIG. 7b with each of blocks 160–166 programmed to function according to the parameters related to the corresponding layer of the retina of FIG. 7a.

Single point measurements in all physiological layers can be used as responses to the on-center and off-center light stimuli. A secondary algorithm can be derived to adjust the different template elements for on-center and corresponding off-center images. Normally, these adjustments are performed in a heuristic way, taking into account the physiological information as well as excitation-inhibition, etc. Using a single point measurement and a moving light spot the different template element dynamics or aggregated interactions between neighboring cells (using a larger light spot) can be measured or determined from the literature on the retina, or other sensory organs.

By combining these techniques with multiple grid point measurements in living retinas while applying given single or multiple input light illumination patterns, conventional CNN template design methods can also be used. In the simplest case, the input-output patterns from these experiments can be fed to known template learning algorithms, e.g. a genetic template learning algorithm. In this way the receptive field organization of retina or another sensory organ can be "reverse engineered".

Figure 11A:
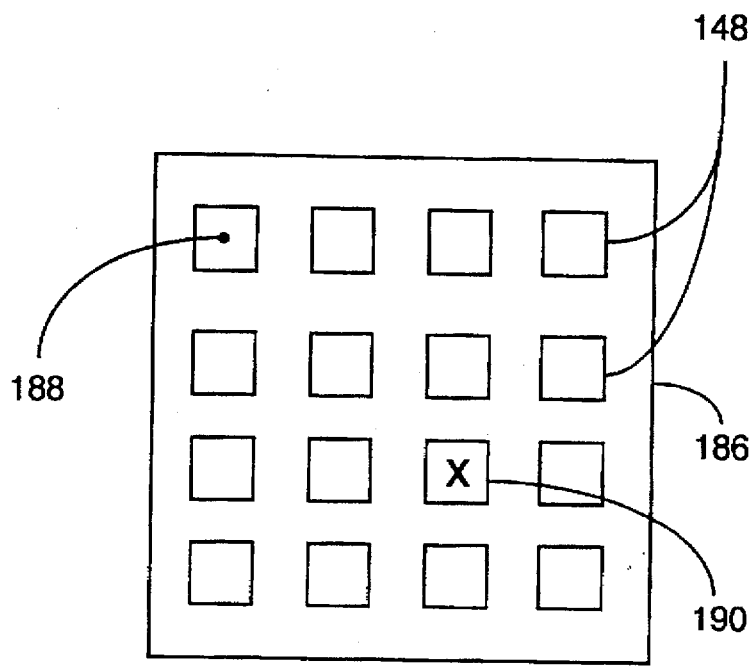
FIG. 11a is a schematic representation of single point measurement of a response of a CNN layer.
Figure 11B:
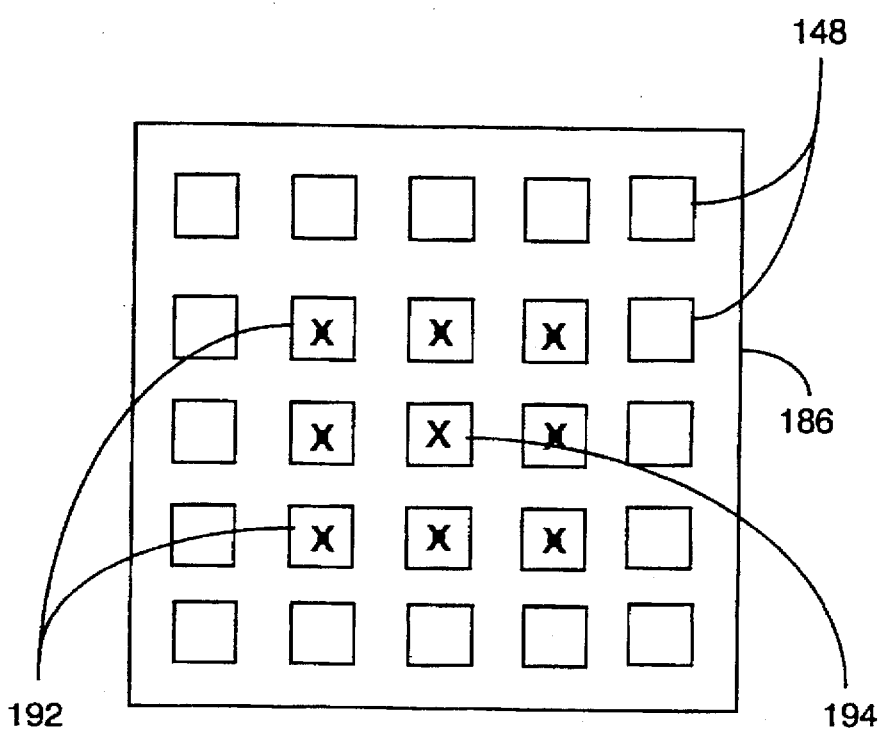
FIG. 11b is a schematic representation of multiple point measurement of a response of a CNN layer.

FIGS. 11a and 11b illustrate these single point multiple point measurements on a CNN layer 186 containing an array of individual CNN cells 148. In FIG. 11 a the single point measurement technique is illustrated with the excitation point 188 (shown as "●") a being applied in the upper left corner cell (cell 11 of the upper left r=1 neighborhood of cells) and the measurement point (shown as "x") in the next to the lowest tier cells that is the second in from the right (cell 33 of the upper left r=1 neighborhood of cells). The relative geometry of the excitation/measurement points are the same as that of the "A" and "B" templates. If either "A" or "B" is all zeros, then the measurement is done directly at the $a_{11}$ or $b_{11}$ element in the r=1 neighborhood of cells. Assuming that r=1 and the "A" and "B" templates are $$A = \begin{bmatrix} a_{11} & a_{12} & a_{13} \\ a_{21} & a_{22} & a_{23} \\ a_{31} & a_{32} & a_{33} \end{bmatrix} B = \begin{bmatrix} b_{11} & b_{12} & b_{13} \\ b_{21} & b_{22} & b_{23} \\ b_{31} & b_{32} & b_{33} \end{bmatrix}$$

If both "A" and "B" at a given position (e.g. 23) are both non-zero, then it is necessary to make heuristic adjustments using CNN simulators to identify the combined effects, or several single point measurements are made and then the "learning" algorithms are used to calculate the "A" and "B" template values.

In FIG. 11b the r=1 neighborhood of cells is shown centered in CNN layer 186 with each of the cells in the neighborhood being measurement cells (denoted by the inclusion of an "x" in each cell) and only the cells surrounding the center cell being excitation cells (denoted by the inclusion of an "574 " in those cells). In a multiple point measurement, as illustrated here, the input/output pairs are measured and fed into the "learning" algorithm (e.g. a genetic template learning cell) where the "A" and "B" template values are calculated.

Programmable Layer Compression and Expansion

Biological retinas consist of sheets, or layers, of neurons, arranged in very large arrays existing of between 1 million or 100,000 neurons. The number of element decreases dramatically as one moves from the outer to the inner layers of the retina. Therefore the grain of the retina changes, dynamically. In order to account for the changes in grain, a mechanism for programming layer compression or expansion, whereby the number of elements and the distance between these elements can be modified in the program, must be included in the CNN bionic eye.

In the CNN universal chip, the functions of layer compression and expansion can be performed for grain of layers by using a physical CNN grid with the number of cells corresponding to the finest grain (the most CNN or retinal cells), with some of the rows and columns of the CNN chip programmed to switch off to simulate other layers of the retina with a coarser grain.

Also, the function of a single biological layer can be broken into sub-steps and modeled with more CNN layers (e.g., for the outer plexiform layer of the retina, 2 CNN layers can be used, one to model the interactions between the photoreceptors and the second for the horizontal cells) or the function of several biological layers can be lumped into a single CNN layer (e.g., the function of the photoreceptors, the outer plexiform layer, and the inner plexiform layers).

The compression of the function of retinal layers is done in the CNN universal machine by deleting the time multiplexing in the multi-layer CNN analogic algorithm. Another technique is to use complex cells (i.e. 2–3 layers physically compressed by grouping the cells in identical positions on different layers into a single complex cell, which is then placed on a single physical layer on silicon).

Further extensions of layers can be implemented by time multiplexing of the layer dynamics and assigning additional local memory units (LAM 112 or LLM 114 in FIG. 3b).

Mechanisms of Adaptation

Biological retina function is not fixed, but can vary as the visual scene or the goals of the host are changed. For example, the "gain" of the retina is decreased when brightness of the visual scene increases. Gain is also decreased in local regions when the texture or contrast in those regions increases. These gain changes keep the retinal output within an acceptably narrow range of magnitudes, regardless of input conditions. Similarly, it is thought that biological retinal function can vary according to conditions of stress or excitement. In the CNN bionic eye, output from the eye itself can be directed to the GAPU (102 of FIG. 3c), which in turn can modify the behavior of the CNN bionic eye.

The adaptation may be controlled by intrinsic conditions, for example, when the difference between two consecutive values at some given test cell is higher than a prescribed value the value of capacitor, $C_x$, could be decreased, thus adapting the speed of the circuit to the variation of the actual scene. Another example is the adaptation to local illumination within a finite radius where an illumination sensing template can control the local threshold bias term, lij.

Extrinsic conditions or direct control of the analogic algorithm represented in the global analogic control unit GACU (108 of FIG. 3c) can also be implemented. In this way, the context of a pattern may govern the adaptation. A prescribed sequence of templates and the logical combination of their results is a standard way of detecting complex events. For example, a template can be used for detecting horizontal lines, another for detecting red areas, and then the logical combination of these two templates will show only horizontal lines in red areas.

A given sequence of a small number of templates can be implemented without the analog program register (APR 104 in FIG. 3c) by locally switching between different transconductance values. Hence, the global wires connected to APR (104 in FIG. 3c) can be deleted and the coded switch sequences stored in SCR (115 in FIG. 5). Such complex cells can also be used in implementing color processing.

Alternative Implementations

Since the retina of the eye of each animal has only a few layers with most of the interaction between layers being between those layers that are physically adjacent to each other, the actual operation of the retina can be said to be substantially serial. That being the case, the CNN bionic eye modelling of the operation of the biological retinal function could be performed with a single CNN chip. This can easily be accomplished since the CNN cell functions so much faster than the retina of a biological eye and since there are only a small number of variables that are necessary to program each function performed by each layer of a biological retina. Thus, the initial inputs ("A", "B" and "T" template values) for the CNN bionic eye are derived from at least one optical sensor that is viewing the desired scene. Then the results of the simulation of the first function of a biological retina can be stored in memory. From those stored values the analogic program can calculate the "A", "B" and "T" template values for the next retinal layer to be simulated. This process can then be repeated for each of the retinal functions with each reprogramming of the single CNN chip being a "virtual layer" and thus performing the same function as discussed above where multiple layers CNN chips were utilized. In summary then, by using a single CNN chip the analogic program calculates the values for one layer and then locally stores those analog values, pixel by pixel, that result from the function performed at that "layer" is used to select the necessary templates for the next "layer", and then continue similarly, "layer" by "layer".

Because of the memories, LAM (112 in FIG. 3b) in the CNN cell, if there are photoreceptors (e.g. CCDs) on the IC chip, then the result (e.g. the illumination level of each pixel) can be stored. Assume that the output of that CNN "layer" is of the simulated rods and cones, then the CNN chip is re-programmed to represent the function of the next layer of the retina, and so on and so forth. Because the actual length of time that it takes the eye to process the information through all of its layers is some much longer than the processing time of the CNN universal machine that is programmed as a bionic eye, the simulated processing can be done with a single CNN chip that is programmed in "virtual layers" to perform each of the necessary steps to fully model retinal function. This then requires time delays in the CNN process, as discussed above, to fully simulate that performance of the eye.

In essence what is happening in the CNN bionic eye that is implemented with a single CNN chip is that the processed signals at each step, or "virtual layer", are stored in memory, then from those stored signals new "A" and "B" templates to simulate the next function are derived in the computing unit under control of the analogic program, and the stored data from the previous "layer" is processed. The result of the next processing step is then stored in memory, and the parameters for the next process step are derived and that data is again processed, and so on for each function of the retina.

If the biological function being simulated includes one or more steps, where data resulting from more than one previous layer is necessary for some computation, it would only be necessary to increase the size of the local memory so that multiple pixel values can be stored. Alternatively, if the situation is such, as it is with the use of the CNN universal machine to model the performance of the eye, that the biological processing time is much longer than the CNN processing time to perform the same function, it would be possible to store and use the pixel values from multiple layer functions to calculate the necessary "A" and "B" template values for a subsequent function and still be able to use only a single CNN chip.

If the vast difference in time between the functional speed of the organ to be modelled and the CNN chip is not available, then multiple CNN chips could be interconnected to perform at least some of the functions either serially, or in parallel, or in both. Also, some portions of the program may be independent of the previous result in which case the program need not interact with the memory, and the program proceeds with the selection of the next templates to perform the next function, accordingly.

Combining Several CNN Bionic Retinas and Modalities

A given set of bionic retinas implemented as described above, can be combined in a prescribed or adaptive way. Since the retinal models of different species have some similar parts/layers, the templates common in more than one bionic retina can be stored in the analog program register, APR (104 in FIG. 3c), only once. Hence, the size of the APR (104 in FIG. 3c) needs only to be equal to the number of different templates for all species, and other desirable functions.

Additional local output memories (LAM 112 or LLM 114 in FIG. 3b) can be used to store the results of different bionic retinas of different species. Thus, these different resulting images can be combined locally without reading out all the different output images. In this way, different capabilities of different species are combined.

The combination of different CNN bionic retinas can be controlled by the GACU (108 of FIG. 3c) in the same way the adaptation of a single CNN bionic retina has been described above. Thus, the aria logic program stored in the GACU (108 of FIG. 3c) can program the switches between the bionic retinas of different species within a microsecond.

Other topographic sensory modalities can be represented in the same way as vision. Using microsensors attached to all CNN cells, pressure (or pressure difference), temperature, chemical parameters, etc., all the other sensory information, can be processed by a single CNN universal chip. The se 2-dimensional sensor arrays can be designed in the same way as the CNN bionic eye, however, here the "images" and "maps" represent pressure-maps, temperature-maps, etc.

The physical implementation of the multiple modalities can be on a single or multiple chips. In the first case, the different microsensors are to be integrated on each cell of the CNN universal chip. In the latter case, the particular ability of the CNN universal chip to interface directly with digital systems provides an excellent way to perform this combination.

Figure 10:
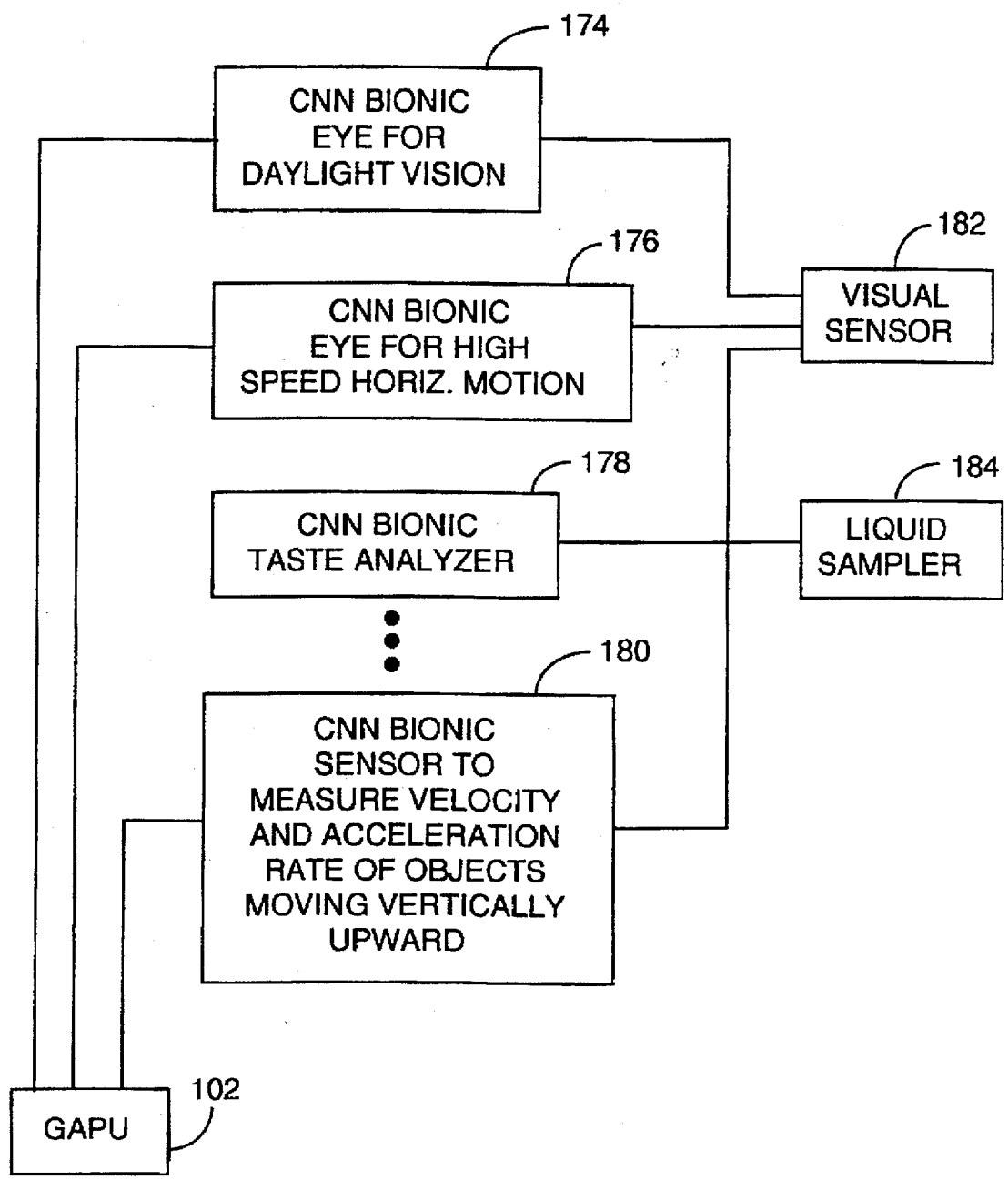
FIG. 10 is a diagrammatical representation of an analogic algorithm for combining various modalities in the same CNN universal machine.

FIG. 10 illustrates the combination of several different functions and modalities in the same CNN universal machine. In FIG. 10 there are four functions shown with an indication that additional ones could also be incorporated. Shown here is a bionic eye for daylight vision (174), a bionic eye for high speed horizontal motion detection (176), a bionic taste analyzer (178), and a bionic sensor to measure velocity and the acceleration rate of objects moving vertically upward (180), with each of these modalities under the control of GAPU 102. Also shown are a visual sensor 182 for providing input information to blocks 174, 176 and 180, and a liquid sampler 184 for providing input information to block 178. As discussed above, each of blocks 174–180 could each be implemented on one, or a number of CNN layers, or virtual layers. It is also possible that all of these functions, and many more could be implemented as virtual layers within the same CNN virtual machine given the vast relative speed difference between the CNN universal machine and biological systems.

Sample Applications

In addition to the applications described at various locations above, the CNN bionic eye, with its multiple functionalities, is ideally applicable to many medical diagnosis and screening tasks. Detecting slight defects, enhancing the contours of many medical imaging devices (especially in the less destructive ones, e.g. ultrasound devices), and extracting selections, are just a few.

Remote sensing is an other area where mimicking different bird's eye views can be implemented.

Combining visual and tactile information in robots exploits the local analog memory of the CNN bionic eye and tactile sensor. Combining visual and thermographic images, as well as images at different illumination conditions (e.g. infrared) are other possibilities.

The CNN bionic eye, as well as a CNN bionic form of other organs, could also be used to simulate normal and diseased functioning of those organs, and other complicated medical or physical conditions to permit research using the CNN bionic system to simulate potential corrections for the problem. For example, the CNN bionic eye can simulate complicated conditions such as spiral wave distortions in the eye which could lead to corrections for that type of problem without having to use living volunteers. A similar system might also be used to simulate problems such as that which exists with the Rubble telescope which could quickly lead to a "fix" which might be delivered to the telescope while in orbit without having to bring the telescope back to Earth, or having to build and launch another one.

Night vision could be enhanced with the addition of the ability to see in the infra-red spectrum. Also the ability to measure the rate of movement that is being observed since the human eye-brain can detect motion, but it can not measure it. With the CNN bionic eye with the proper templates, could actually measure rates of motion, as could angular velocity. Further, it might be useful to detect certain rates of motion but not others, or motion in a particular direction - the human eye does not make those kinds of distinctions, humans can detect just about everything in the visual spectrum. Other things that might prove useful in some situations might also be the ability to see only certain limited light frequencies or to see only horizontal motion.

What the human brain does is interpret what information it receives. In a bionic eye there could be many layers beyond those that simulate retinal function which perform interpretive functions far beyond what any animal can naturally do.

The second part of the invention is that the CNN bionic eye makes it possible to combine the function of multiple eyes from different animals, or to combine selected functions from several animals, or even to combine functions of multiple organs in the same bionic "organ".

Almost all biological senses are laid out in a two dimensional array. Touch and taste, olfaction and hearing as well. So all of these modalities present an image, 2-dimensional image, that can be processed in a similar fashion, thus the same CNN universal machine could be used to process them all, individually or collectively. Additionally, biologically many modalities overlay in reality and register at the same location—visual, auditory, tactile, thus a CNN universal machine that combines sensors for various biological modalities on the same chip and processes them all is not so unusual. For many of those senses there are different microsensors that can be placed on the same chip, or connected to the same chip, to detect pressure, touch, sight, chemical analysis, etc. What is truly interesting is that the CNN universal machine of the present invention, if the time delays to simulate animal performance are omitted, can perform all of these functions using the same chip in less time than the biological organism can perform those same functions. Further, since the entire motor system is triggered at the same point in the brain since visual, auditory, tactile stimuli, etc., all converge at the same place, once an interface is developed between the CNN universal bionic machine of the present invention and the brain, any of those senses that might have been lost could be replaced, or the current senses could even be enhanced.

To those skilled in the art to which the invention disclosed herein relates, many changes in construction and widely differing embodiments and applications of the invention will suggest themselves without departing from the spirit and scope of the invention. The disclosures and the descriptions herein are purely illustrative and are not intended to be in any sense limiting. The actual scope of the invention described herein is only limited by the scope of the appended claims.

What is claimed is:

1. A method for creating a model of functions of a plurality of distinct topographic physiological sensory organs in response to a set of stimuli, with each of said functions performed by an array of cells arranged in a pattern having a grain density, with said grain density being defined as the number of cells per square unit said method comprising the steps of:

a. selecting a plurality of topographic physiological sensory organs to be modelled by said model as a part of the same process;

b. selecting stimuli to which said model is to respond from a set of stimuli to which said organs selected in step a. respond;

c. selecting the grain density and shape for each of said arrays of cells of said organs selected in step a. appropriate to perform said functions;

d. configuring a Cellular Neural Network (CNN) universal machine to have an array of cells that has a shape and grain density corresponding to the largest shape and greatest grain density, respectively, of said organs selected in step a.;

e. selecting a plurality of sets of sensors with one set of sensors to detect each of said stimuli selected in step b.;

f. interfacing at least one sensor of one of said plurality of sets of sensors selected in step e. to each cell of said CNN universal machine as configured in step d. and matching the grain density and shape for the corresponding organ as selected in step b., with each of said sets of sensors being responsive to one of said stimuli selected in step b. and individually developing an output signal compatible with that cell of said CNN universal machine to which said sensor is interfaced, with said individual signal being representative of a corresponding stimuli received by said individual sensor; and g. programming said CNN universal machine to implement said functions of said topographic sensory organs as part of the same process.

2. A method as in claim 1 wherein:

step a. includes selecting the same topographic physiological sensory organ from two different organisms for inclusion in the same said model.

3. A method as in claim 1 wherein:

step a. includes selecting two different topographic physiological sensory organs from the same organism for inclusion in the same said model; and step b. includes selecting said set of stimuli to which said model is to respond from a combination of stimuli to which each of said organs selected in step a. respond.

4. A method as in claim 1 wherein in step g. said functions of said topographic sensory organs are implemented sequentially.

5. A method as in claim 1 further includes the step of:

h. correlating the responses of said model to said set of stimuli resulting from a common event.

6. A method for creating a model of a function of a topographic physiological sensory organ in response to a set of stimuli, with said function performed by an array of cells arranged in a pattern having a grain density, with said grain density being defined as the number of cells per square unit, said method comprising the steps of:

a. selecting a topographic physiological sensory organ to be modelled by said model;

b. selecting the stimuli to which said model is to respond from a set of stimuli to which said organ selected in step a. responds;

c. selecting the grain density and shape said array of cells of said organ selected in step a. appropriate to perform said function;

d. configuring a Cellular Neural Network (CNN) universal machine to have an array of cells that has said shape and said grain density selected in step c. of said organ selected in step a.;

e. selecting a set of sensors to detect said stimuli selected in step b.;

f. interfacing one of said set of sensors selected in step e. to each cell of said CNN universal machine as configured in step d., with each of said set of sensors being responsive to said stimuli selected in step b. and individually developing an output signal compatible with that cell of said CNN universal machine to which said sensor is interfaced, with said individual signal being representative of said stimuli received by said individual sensor;

g. programming said CNN universal machine to implement said function of said topographic sensory organ, including programming a defect in the normal performance of said selected physiologically topographic sensory organ being modelled; and h. performing diagnostic tests following step g. to research potential corrective actions that may be possible to correct or improve the performance of said selected physiologically topographic sensory organ in a living organism.

7. A method for creating a model of a function of two topographic physiological sensory organs in response to a stimuli, with said function performed by an array of cells arranged in a pattern having a grain density, with said grain density being defined as the number of cells per square unit, said method comprising the steps of:

a. selecting the same topographic physiological sensory organ to be modelled by said model from two different organisms;

b. selecting a set of stimuli to which said model is to respond from a combination of stimuli to which each of said organs selected in step a. respond;

c. selecting a grain density and shape for said array of cells of said organ selected in step a. appropriate to perform said function, said grain density and shape corresponding to the greatest grain density and largest shape, respectively, of said two organs selected in step a.

d. configuring a Cellular Neural Network (CNN) universal machine to have an array of cells that has said shape and said grain density selected in step c. of said organ selected in step a.;

e. selecting a set of sensors to detect said set of stimuli selected in step b.;

f. interfacing one of said set of sensors selected in step e. to each cell of said CNN universal machine as configured in step d. with each of said set of sensors being in proportion to said stimuli selected in step b. and individually developing an output signal compatible with that cell of said CNN universal machine to which said sensor is interfaced, with said individual signal being representative of said stimuli received by said individual sensor;

g. programming said CNN universal machine to implement said function of said topographic sensory organ, including programming a defect in the normal performance of said selected physiologically topographic sensory organs, or the interaction between them, being modelled; and h. performing diagnostic tests following step g. to research potential corrective actions that may be possible to correct or improve the performance of said selected physiologically topographic sensory organs and the interaction between them.

8. Apparatus to create a model of a function of a topographic physiological sensory organ having an array of cells arranged in a pattern size and shape, and grain density, with said grain density being defined as the number of cells per square unit, with said physiological sensory organ performing in response to a set of externally applied stimuli, said apparatus comprising:

a Cellular Neural Network (CNN) universal machine having an array of CNN cells in said pattern size, shape and grain density of said physiological sensory organ;

a set of sensors with one of said sensors interfacing with each CNN cell, each of said sensors disposed to be individually responsive to said externally applied stimuli and to individually develop a signal responsive to said stimuli received by said individual sensor and then to apply said individually developed signal to the corresponding one of said CNN cells;

a processor connected to said CNN universal machine to sequentially program said CNN universal machine to simulate the performance of a second series of steps in a selected order in response to signals from said set of sensors in response to said externally applied stimuli, said steps of said second series selected from said first series of steps performed by said topographic physiological sensory organ; and a memory interfaced with said processor;

wherein said processor stores to said memory the results of each step as necessary to perform subsequent steps; and wherein said processor programs said CNN cells to simulate performance of a selected second series of steps with those steps selected from said first series of steps of two different topographic sensory organs in the same organism.

9. Apparatus to create a model of a function of a topographic physiological sensory organ having an array of cells arranged in a pattern size and shape, and grain density, with said grain density being defined as the number of cells per square unit, with said physiological sensory organ performing in response to a set of externally applied stimuli, said apparatus comprising:

- a Cellular Neural Network (CNN) universal machine having an array of CNN cells in said pattern size, shape and grain density of said physiological sensory organ;
- a set of sensors with one of said sensors interfacing with each CNN cell, each of said sensors disposed to be individually responsive to said externally applied stimuli and to individually develop a signal responsive to said stimuli received by said individual sensor and then to apply said individually developed signal to the corresponding one of said CNN cells;
- a processor connected to said CNN universal machine to sequentially program said CNN universal machine to simulate the performance of a second series of steps in a selected order in response to signals from said set of sensors in response to said externally applied stimuli, said steps of said second series selected from said first series of steps performed by said topographic physiological sensory organ; and
- a memory interfaced with said processor;
- wherein said processor stores to said memory the results of each step as necessary to perform subsequent steps; and
- wherein said processor programs said CNN cells in said second series of steps to faithfully simulate said first series of steps and the sequence performed by a selected physiologically topographic sensory organ; and
- said processor stores in said memory program variations for use by said processor to alter the program of said CNN cells to simulate a defect in the normal performance of said selected physiologically topographic sensory organ being modelled to permit the performance of diagnostic tests on said model to research potential corrective actions that may be possible to correct or improve the performance of said selected physiologically topographic sensory organ in a living organism.

10. Apparatus to create a model of a function of a topographic physiological sensory organ having an array of cells arranged in a pattern size and shape, and grain density, with said grain density being defined as the number of cells per square unit, with said physiological sensory organ performing in response to a set of externally applied stimuli, said apparatus comprising:

- a Cellular Neural Network (CNN) universal machine having an array of CNN cells in said pattern size, shape and grain density of said physiological sensory organ;
- a set of sensors with one of said sensors interfacing with each CNN cell, each of said sensors disposed to be individually responsive to said externally applied stimuli and to individually develop a signal responsive to said stimuli received by said individual sensor and then to apply said individually developed signal to the corresponding one of said CNN cells;
- a processor connected to said CNN universal machine to sequentially program said CNN universal machine to simulate the performance of a second series of steps in a selected order in response to signals from said set of sensors in response to said externally applied stimuli, said steps of said second series selected from said first series of steps performed by said topographic physiological sensory organ; and
- a memory interfaced with said processor;
- wherein said processor stores to said memory the results of each step as necessary to perform subsequent steps; and
- wherein said processor programs said CNN cells in said second series of steps to faithfully simulate said first series of steps and sequence of two selected topographic physiological sensory organs within the same organism and interactions therebetween; and
- said memory stores program variations for use by said processor to alter the program on said CNN cells to simulate a defect in the normal performance and interaction between said two selected physiologically topographic sensory organs to permit the performance of diagnostic tests on said model to research potential corrective actions that may be possible to correct or improve the performance of said two topographic physiological sensory organs and the interaction between them in a single living organism.

11. Apparatus to create a model of a function of a topographic physiological sensory organ having an array of cells arranged in a pattern size and shape, and grain density, with said grain density being defined as the number of cells per square unit, with said physiological sensory organ performing in response to a set of externally applied stimuli, said apparatus comprising:

- a Cellular Neural Network (CNN) universal machine having an array of CNN cells in said pattern size, shape and grain density of said physiological sensory organ;
- a set of sensors with one of said sensors interfacing with each CNN cell, each of said sensors disposed to be individually responsive to said externally applied stimuli and to individually develop a signal responsive to said stimuli received by said individual sensor and then to apply said individually developed signal to the corresponding one of said CNN cells;
- a processor connected to said CNN universal machine to sequentially program said CNN universal machine to simulate the performance of a second series of steps in a selected order in response to signals from said set of sensors in response to said externally applied stimuli, said steps of said second series selected from said first series of steps performed by said topographic physiological sensory organ; and a memory interfaced with said processor;

wherein said processor stores to said memory the results of each step as necessary to perform subsequent steps; and wherein said processor programs said CNN cells to simulate performance of a selected second series of steps, with those steps selected from said first series of steps of the same topographic sensory organ of two different living organisms.

12. A sensor to detect a selected applied topographic stimulus that is outside the usual range of human physiological sensory organs and to present a representation of said stimulus in a form that is within the usual stimulus range of a selected human physiological sensory organ, said sensor comprising:

a Cellular Neural Network (CNN) universal machine having an array of CNN cells of a selected pattern size and shape, and grain size density to provide a desired resolution of said topographic stimulus, wherein said grain density is the number of cells per square unit;

a set of sensors for measuring stimulus outside the usual range of human physiological sensory organs, with one of said sensors interfacing individually with each CNN cell, each of said sensors disposed to be individually responsive to said topographic stimulus and to individually develop a signal in response to said stimulus received by said individual sensor, and then to apply said individually developed signal to the corresponding one of said CNN cells;

an output device capable of presenting a response in a form that is within the usual stimulus range of a selected human physiological sensory organ; and a processor connected to said CNN universal machine and to said output device to sequentially program said CNN universal machine and to process signals from each of said CNN cells to format a representation of said stimulus to be applied to said output device.

13. A method for sensing a selected applied topographic stimulus that is outside the usual range of human physiological sensory organs and to present a representation of said stimulus to an output device to present a response in a form that is within the usual stimulus range of a selected human physiological sensory organ, said method comprising the steps of:

a. configuring a Cellular Neural Network (CNN) universal machine to have an array of cells of a selected pattern size and shape, and grain density to provide the desired resolution of said topological stimulus, wherein said grain density is the number of cells per square unit;

b. selecting a set of sensors for measuring stimulus outside the usual range of human physiological sensory organs to detect said applied topographic stimulus;

c. interfacing one of said set of sensors selected in step b. to each cell of said CNN universal machine as configured in step a. with each of said set of sensors being responsive to said applied stimulus and individually developing an output signal compatible with the cell of said CNN universal machine to which it is interfaced with said individual signal being in proportion to said stimulus received by said individual sensor; and d. programming said CNN universal machine to process signals from each of said CNN cells and to format a representation of said stimulus to be applied to said output device to present a response in a form that is within the usual stimulus range of a selected human physiological sensory organ.

14. A method as in claim 13 wherein said method adaptively models sensory function that is outside the usual range of human physiological sensory organs.

15. A method as in claim 13 wherein said modelled sensory function exceeds the complexity and speed of operation of human physiological sensory organs.

16. A method for sensing a selected applied topographic stimulus that is outside the usual range of vertebrate physiological sensory organs and to present a representation of said stimulus to an output device to present a response in a form that is within the usual stimulus range of a selected vertebrate physiological sensory organ, said method comprising the steps of:

a. configuring a Cellular Neural Network (CNN) universal machine to have an array of cells of a selected pattern size and shape, and grain density to provide the desired resolution of said topological stimulus, wherein said grain density is the number of cells per square unit;

b. selecting a set of sensors for measuring stimulus outside the usual range of vertebrate physiological sensory organs to detect said applied topographic stimulus;

c. interfacing one of said set of sensors selected in step b. to each cell of said CNN universal machine as configured in step a. with each of said set of sensors being responsive to said applied stimulus and individually developing an output signal compatible with the cell of said CNN universal machine to which it is interfaced with said individual signal being in proportion to said stimulus received by said individual sensor; and d. programming said CNN universal machine to process signals from each of said CNN cells and to format a representation of said stimulus to be applied to said output device to present a response in a form that is within the usual stimulus range of a selected vertebrate physiological sensory organ.

17. A method as in claim 16 wherein said method adaptively models sensory function that is outside the range of vertebrate physiological sensory organs.

18. A method as in claim 16 wherein said modelled sensory function exceeds the complexity and speed of operation of vertebrate physiological sensory organs.

* * * * *